(12) United States Patent
Yamazaki

(10) Patent No.: US 8,970,909 B2
(45) Date of Patent: Mar. 3, 2015

(54) IMAGE FORMING APPARATUS

(75) Inventor: Hiroyuki Yamazaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 13/315,502

(22) Filed: Dec. 9, 2011

(65) Prior Publication Data

US 2012/0154826 A1   Jun. 21, 2012

(30) Foreign Application Priority Data

Dec. 17, 2010 (JP) ................................ 2010-282393
Nov. 24, 2011 (JP) ................................ 2011-256415

(51) Int. Cl.
*H04N 1/40* (2006.01)
*H04N 1/405* (2006.01)
*H04N 1/409* (2006.01)
*H04N 1/401* (2006.01)
*H04N 1/52* (2006.01)
*H04N 1/56* (2006.01)

(52) U.S. Cl.
CPC ............. *H04N 1/4015* (2013.01); *H04N 1/405* (2013.01)
USPC ......... 358/3.03; 358/3.06; 358/3.26; 358/534

(58) Field of Classification Search
None
See application file for complete search history.

(56) References Cited

U.S. PATENT DOCUMENTS

| 7,907,306 | B2 * | 3/2011 | Yamazaki | ..................... 358/3.03 |
| 7,907,307 | B2 * | 3/2011 | Yamazaki | ..................... 358/3.03 |
| 7,940,427 | B2 * | 5/2011 | Takemura et al. | ............ 358/3.03 |
| 8,213,054 | B2 * | 7/2012 | Suzuki | .......................... 358/3.03 |
| 8,422,079 | B2 * | 4/2013 | Nakamura | .................. 358/3.03 |
| 8,655,065 | B2 * | 2/2014 | Sumi et al. | .................... 358/3.03 |
| 2009/0059303 | A1 * | 3/2009 | Miyazaki | ..................... 358/3.03 |

FOREIGN PATENT DOCUMENTS

| JP | 2007-108246 | 4/2007 | |
| JP | 2007088927 A | * 4/2007 | ............. H04N 1/405 |

* cited by examiner

*Primary Examiner* — Scott A Rogers
(74) *Attorney, Agent, or Firm* — Fitzpatrick, Cella, Harper & Scinto

(57) ABSTRACT

An image forming apparatus of this invention determines a correction amount for each image signal so as to correct banding as periodic density unevenness in a sub scanning direction, corrects each pixel value of an n-bit image signal in accordance with the correction amount, generates the first corrected image signal, and quantizes, for each pixel, the first corrected image signal into a second corrected image signal of m bits smaller than n bits. This image forming apparatus diffuses, in a main scanning direction, quantization errors at the time of quantization of the first corrected image signal into the second corrected image signal so as to cancel the quantization errors within a predetermined region including a plurality of continuous pixels on a main scanning line.

12 Claims, 27 Drawing Sheets

FIG. 2
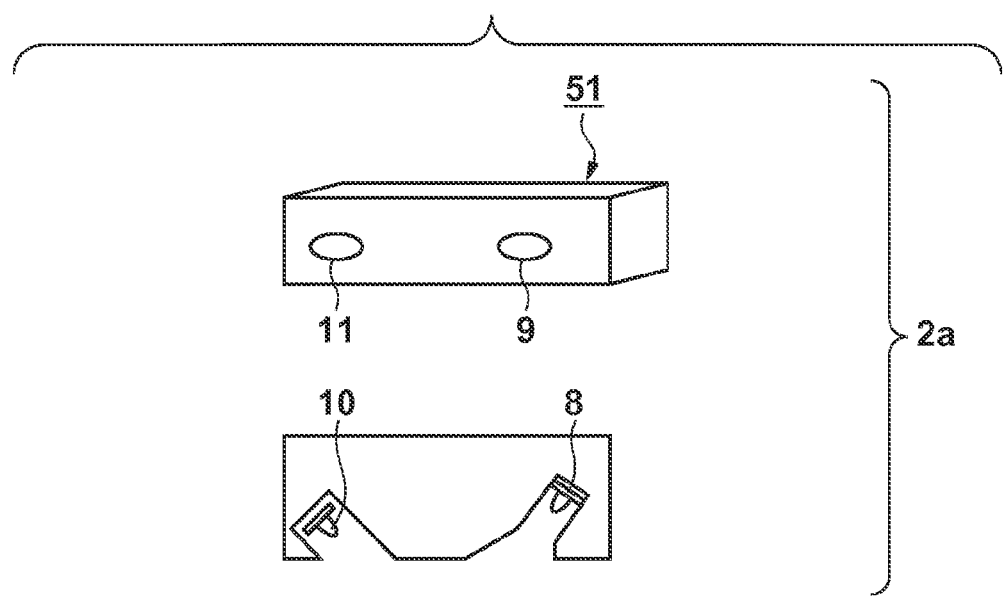
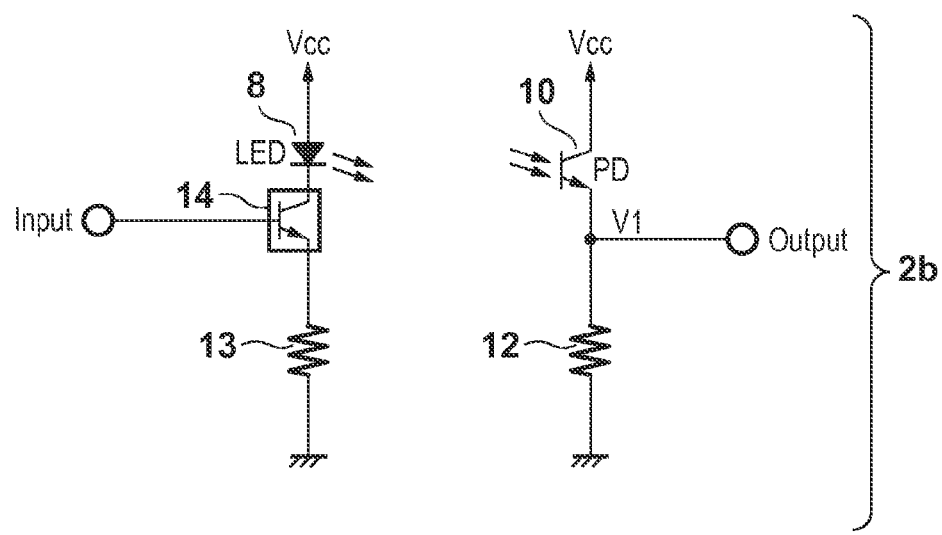

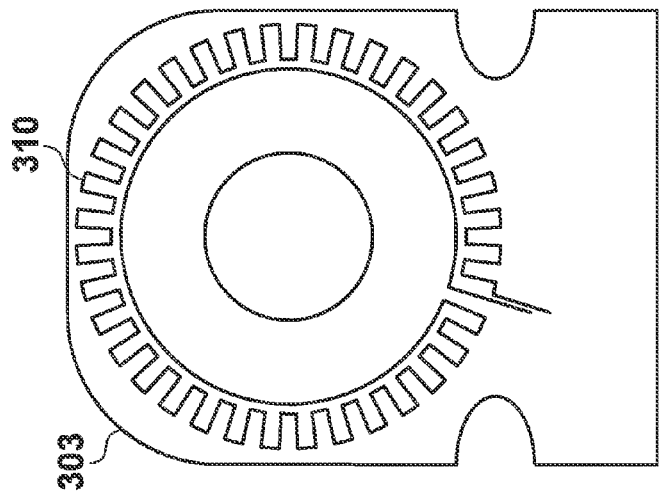
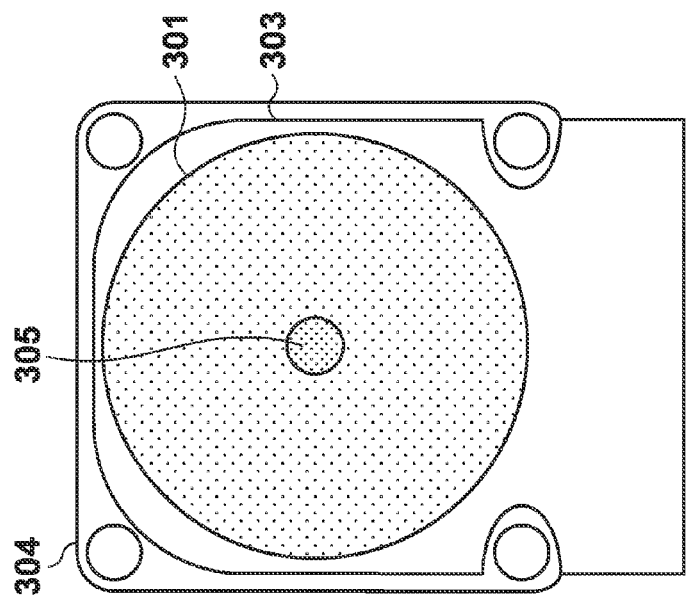
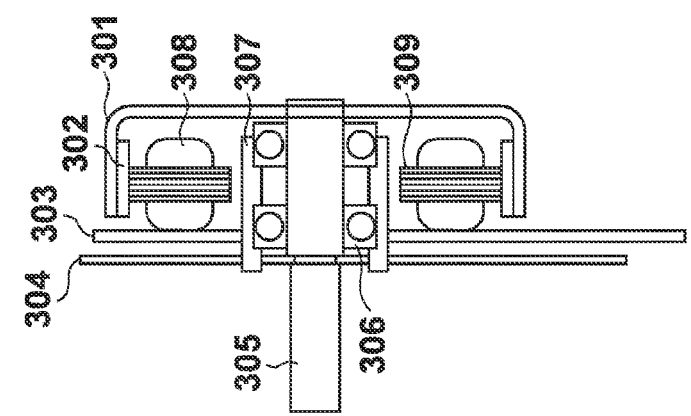

FIG. 4
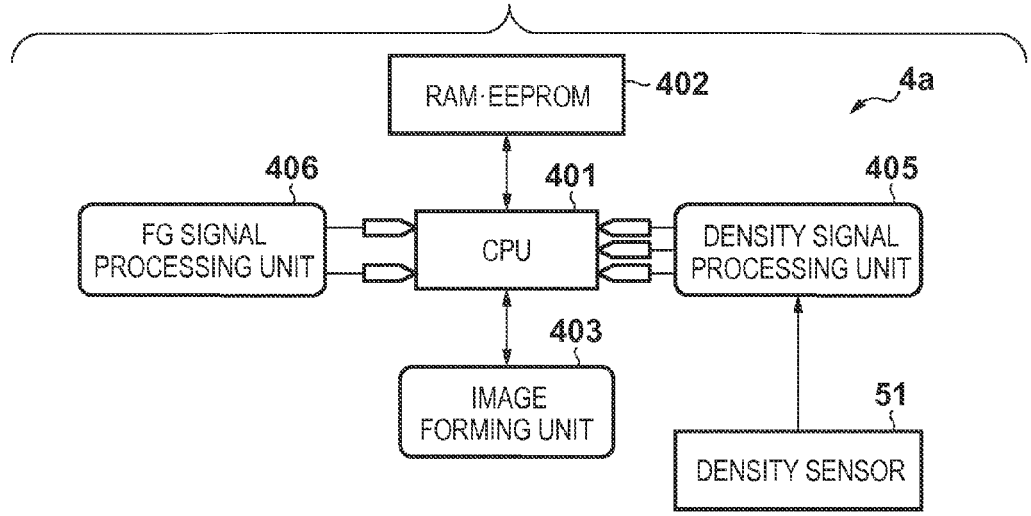
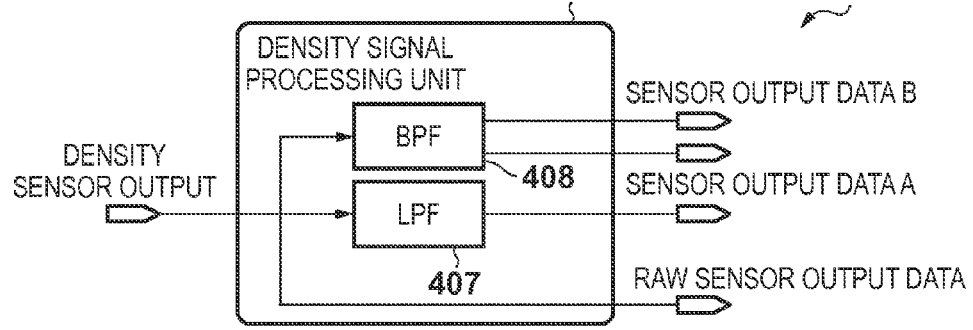
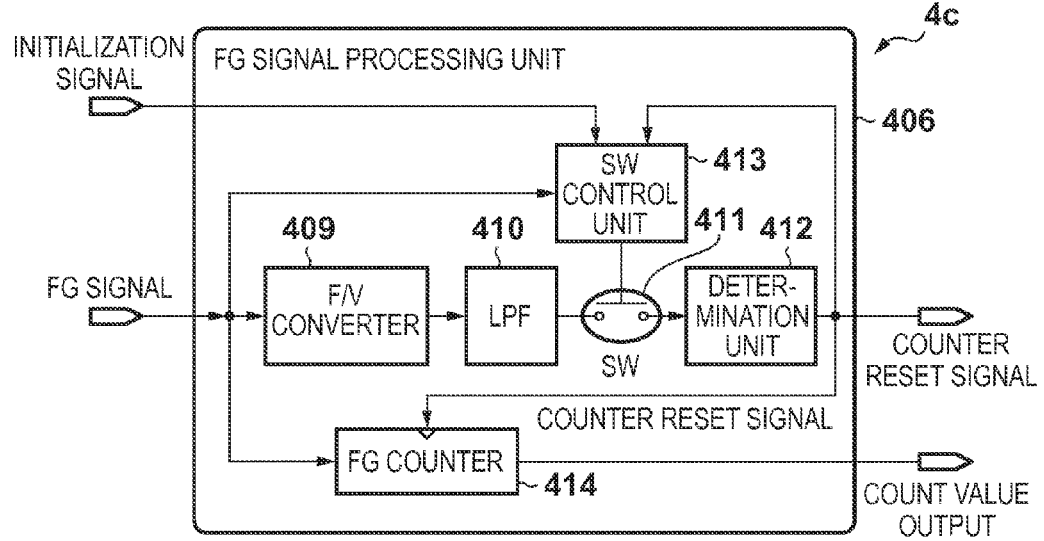

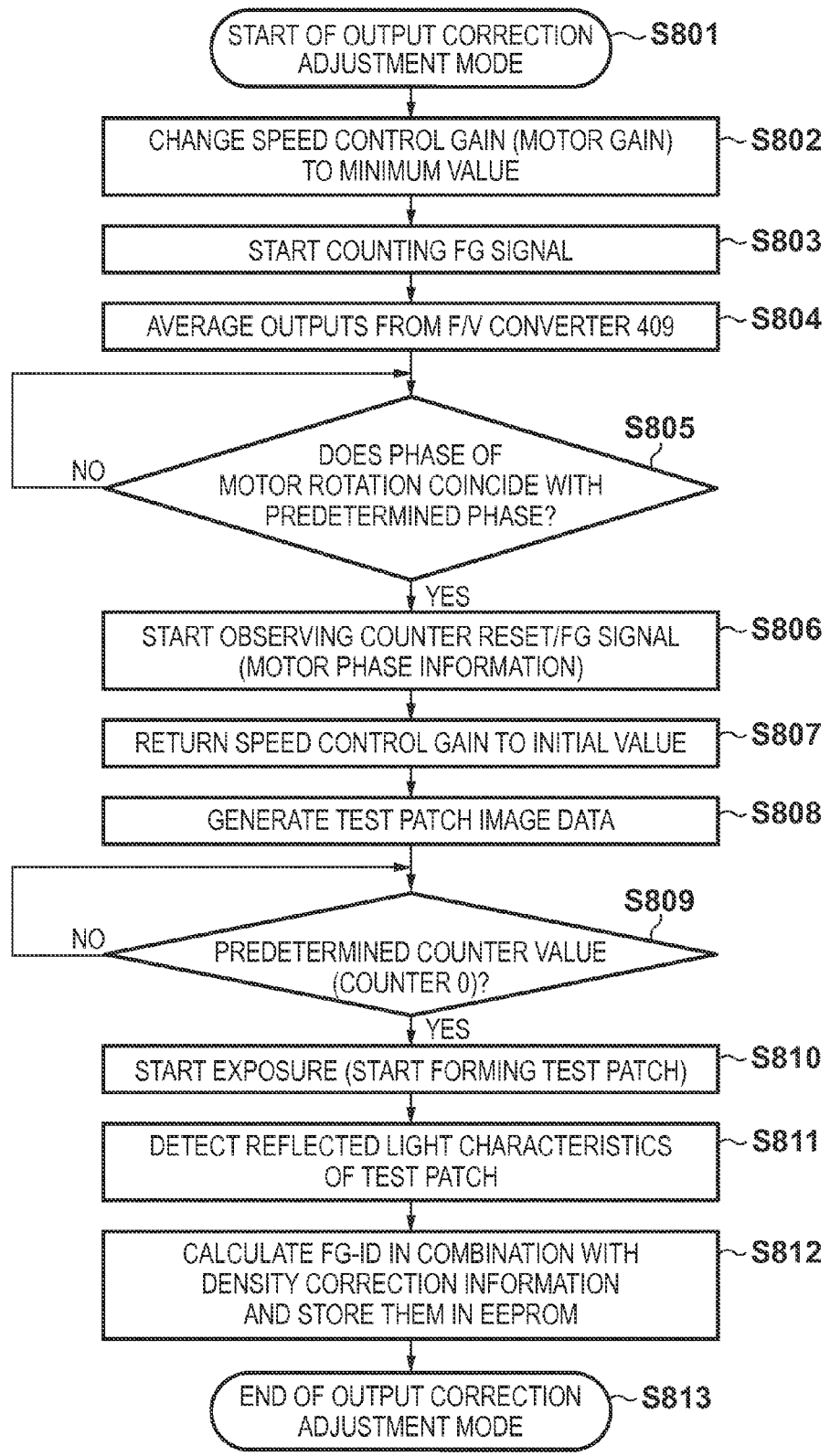

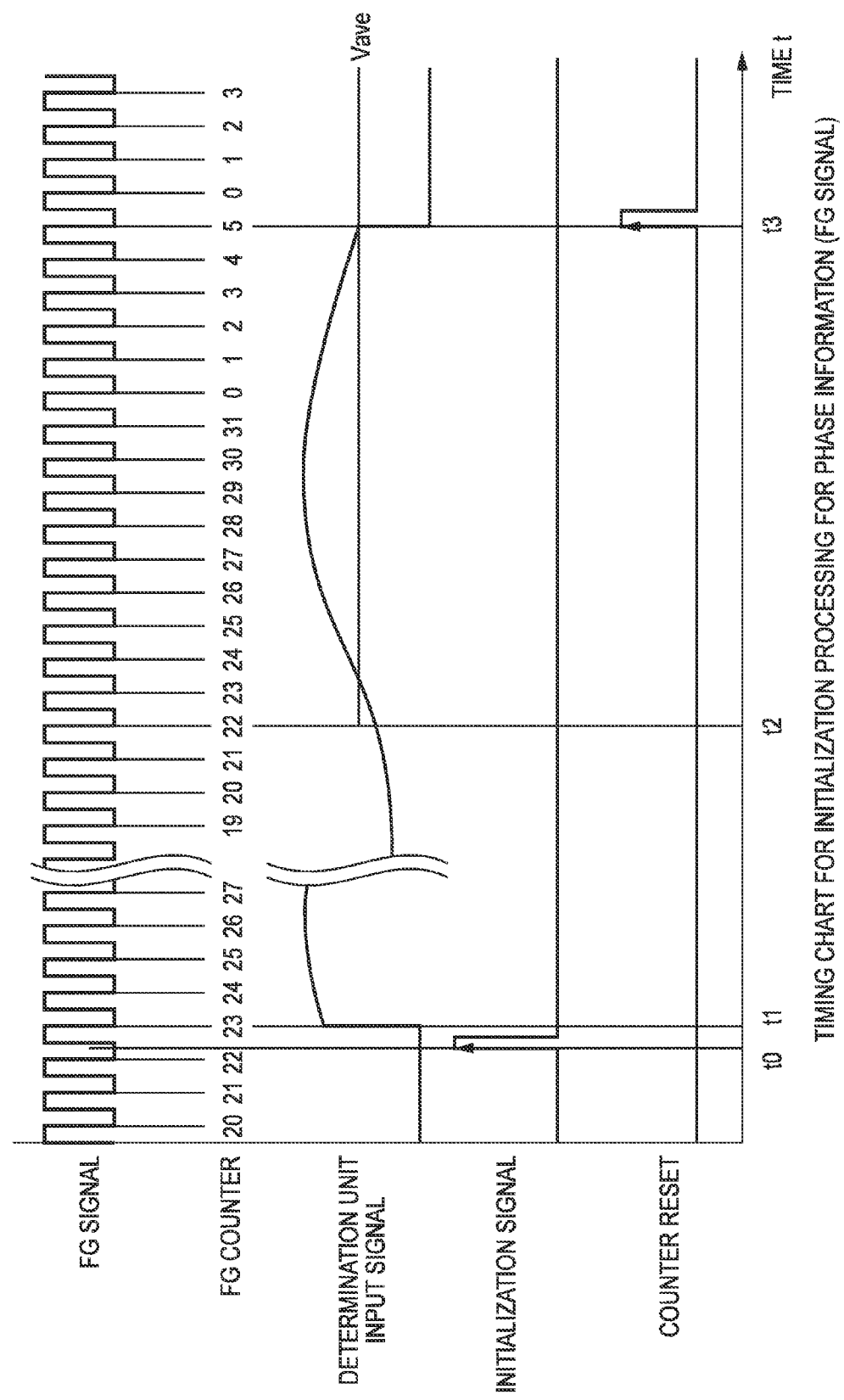

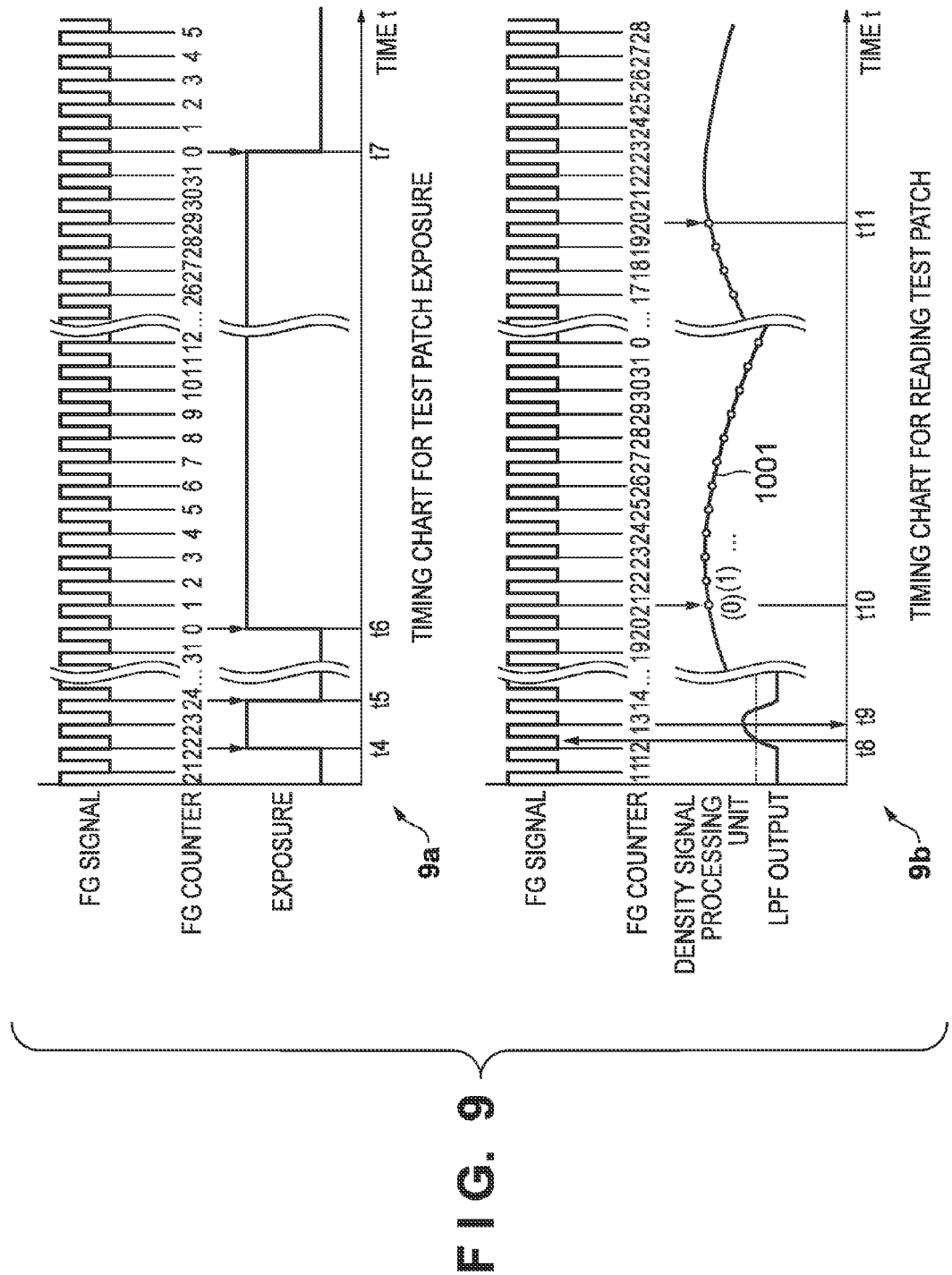

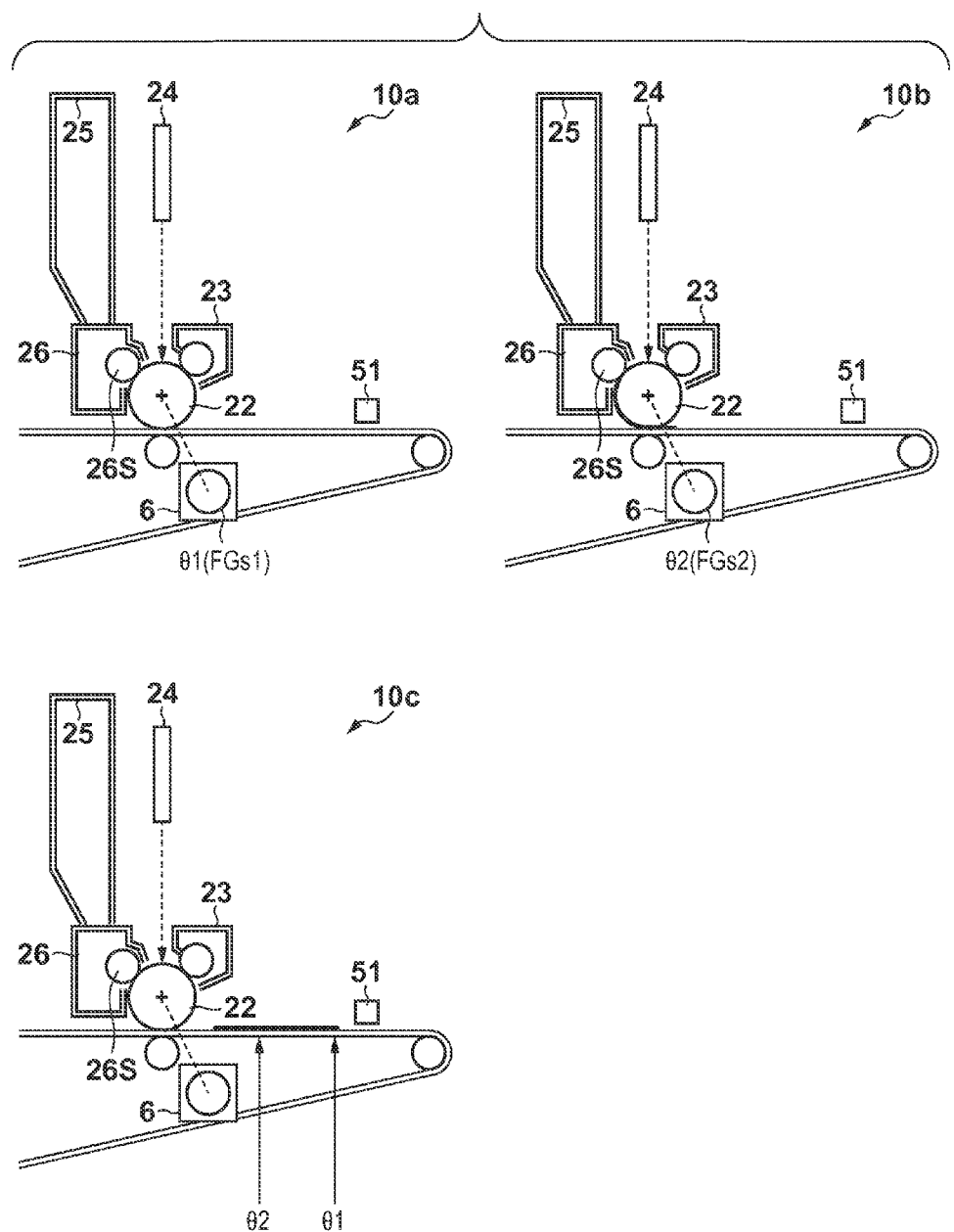

| FG SIGNAL COUNT (PHASE) | DENSITY VALUE |
|---|---|
| 0 | 10.000 |
| 1 | 10.141 |
| 2 | 10.200 |
| 3 | 10.141 |
| 4 | 10.000 |
| 5 | 9.859 |
| 6 | 9.800 |
| 7 | 9.859 |
| 8 | 10.000 |
| 9 | 10.141 |
| ⋮ | ⋮ |
| 31 | 9.800 |
| 30 | 9.859 |

(TABLE A)

CALCULATION OF DIFFERENCE CORRESPONDING TO AVERAGE DENSITY ⇒

| FG SIGNAL COUNT (PHASE) | DIFFERENCE (Δd2) |
|---|---|
| 0 | 0.000 |
| 1 | 0.141 |
| 2 | 0.200 |
| 3 | 0.141 |
| 4 | 0.000 |
| 5 | -0.141 |
| 6 | -0.200 |
| 7 | -0.141 |
| 8 | 0.000 |
| 9 | 0.141 |
| ⋮ | ⋮ |
| 30 | -0.200 |
| 31 | -0.141 |

(TABLE B)

SUM OF DIFFERENCES BETWEEN W1 AND W4

| FG SIGNAL COUNT (PHASE) | SUM OF DIFFERENCES |
|---|---|
| 0 | 0.000 |
| 1 | 0.239 |
| 2 | 0.391 |
| 3 | 0.419 |
| 4 | 0.354 |
| 5 | 0.274 |
| 6 | 0.262 |
| 7 | 0.349 |
| 8 | 0.500 |
| 9 | 0.632 |
| ⋮ | ⋮ |
| 30 | -0.391 |
| 31 | -0.239 |

(TABLE C)

COMPUTATION OF DENSITY VARIATION RATIO FROM SUM OF DIFFERENCES ⇒

| FG SIGNAL COUNT (PHASE) | DENSITY VARIATION RATIO (Dc_n) |
|---|---|
| 0 | 0.00 |
| 1 | 2.39 |
| 2 | 3.91 |
| 3 | 4.19 |
| 4 | 3.54 |
| 5 | 2.74 |
| 6 | 2.62 |
| 7 | 3.49 |
| 8 | 5.00 |
| 9 | 6.32 |
| ⋮ | ⋮ |
| 30 | -3.91 |
| 31 | -2.39 |

(TABLE D)

FIG. 11C

COMPUTATION OF POSITION CORRECTION VALUE FROM DENSITY VARIATION RATIO ⇓

| LINE NUMBER | POSITION CORRECTION VALUE (T_m) |
|---|---|
| 0 | 0.000 |
| 1 | 1.195 |
| 2 | 2.390 |
| 3 | 3.585 |
| 4 | 4.345 |
| 5 | 5.150 |
| 6 | 5.865 |
| 7 | 6.005 |
| 8 | 6.145 |
| 9 | 6.285 |
| ⋮ | ⋮ |
| 6998 | -5.960 |
| 6999 | -6.285 |

(TABLE F)

COMPUTATION OF POSITION CORRECTION VALUE FOR EACH LINE BY INTERPOLATION ⇐

| FG SIGNAL COUNT (PHASE) | POSITION CORRECTION VALUE (Tc_n) |
|---|---|
| 0 | 0.000 |
| 1 | 3.585 |
| 2 | 5.865 |
| 3 | 6.285 |
| 4 | 5.310 |
| 5 | 4.110 |
| 6 | 3.930 |
| 7 | 5.235 |
| 8 | 7.500 |
| 9 | 9.480 |
| ⋮ | ⋮ |
| 30 | -5.865 |
| 31 | -3.585 |

(TABLE E)

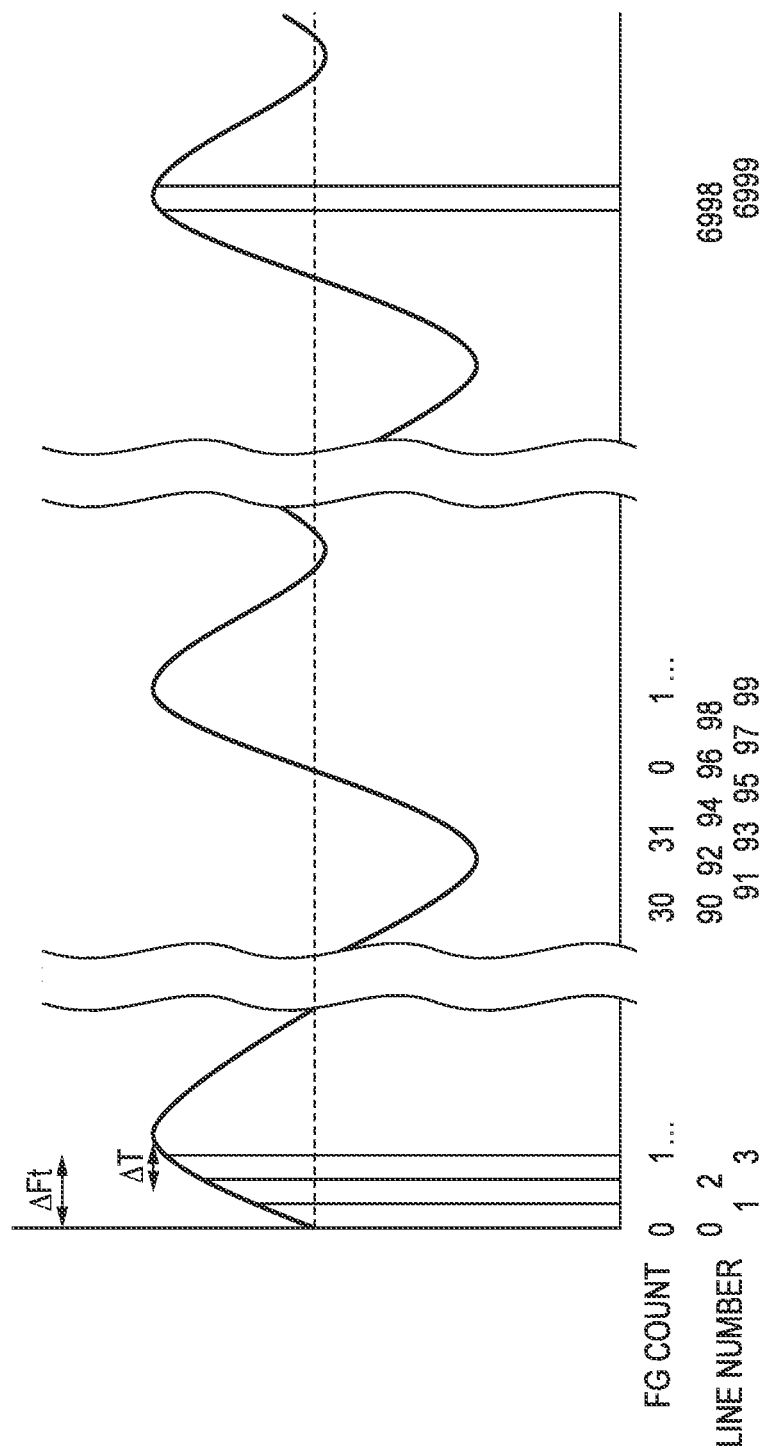

FIG. 17

| 4-BIT EXPRESSION |
|---|
| Q4_0=0 |
| Q4_1=1 |
| Q4_2=2 |
| Q4_3=3 |
| Q4_4=4 |
| Q4_5=5 |
| Q4_6=6 |
| Q4_7=7 |
| Q4_8=8 |
| Q4_9=9 |
| Q4_10=10 |
| Q4_11=11 |
| Q4_12=12 |
| Q4_13=13 |
| Q4_14=14 |
| Q4_15=15 |

17a

| 8-BIT EXPRESSION |
|---|
| Q8_0=0 |
| Q8_1=17 |
| Q8_2=34 |
| Q8_3=51 |
| Q8_4=68 |
| Q8_5=85 |
| Q8_6=102 |
| Q8_7=119 |
| Q8_8=136 |
| Q8_9=153 |
| Q8_10=170 |
| Q8_11=187 |
| Q8_12=204 |
| Q8_13=221 |
| Q8_14=238 |
| Q8_15=255 |

17b

F I G. 18

INPUT IMAGE BUFFER

| | | | | | | | | |
|---|---|---|---|---|---|---|---|---|
| L_m | 68 | 255 | 255 | 0 | 34 | 255 | 255 | 0 |
| L_m+1 | 0 | 0 | 0 | 0 | 0 | 0 | 0 | 0 |
| L_m+2 | 0 | 0 | 0 | 0 | 0 | 0 | 0 | 0 |

TL_m=1.3 [line]

~18a

CORRECTED IMAGE BUFFER

| | | | | | | | | |
|---|---|---|---|---|---|---|---|---|
| L_m | | | | | | | | |
| L_m+1 | 48 | 179 | 179 | 0 | 24 | 179 | 179 | 0 |
| L_m+2 | 20 | 76 | 76 | 0 | 10 | 76 | 76 | 0 |

~18b

1801~

| PIXEL NUMBER (k) | 0 | 1 | 2 | 3 | 4 | 5 | 6 | 7 |
|---|---|---|---|---|---|---|---|---|
| CORRECTED IMAGE SIGNAL (P_k) | 48 | 179 | 179 | 0 | 24 | 179 | 179 | 0 |
| AFTER ADDITION OF DIFFERENCE (P'_k) | 48 | 176 | 185 | -2 | 22 | 184 | 176 | 6 |
| QUANTIZED SIGNAL (Pq_k) | 51 | 170 | 187 | 0 | 17 | 187 | 170 | 0 |
| OUTPUT IMAGE SIGNAL (Q_k) | 3 | 10 | 11 | 0 | 1 | 11 | 10 | 0 |
| DIFFERENCE (E) | -3 | 6 | -2 | -2 | 5 | -3 | 6 | 6 |

~18c

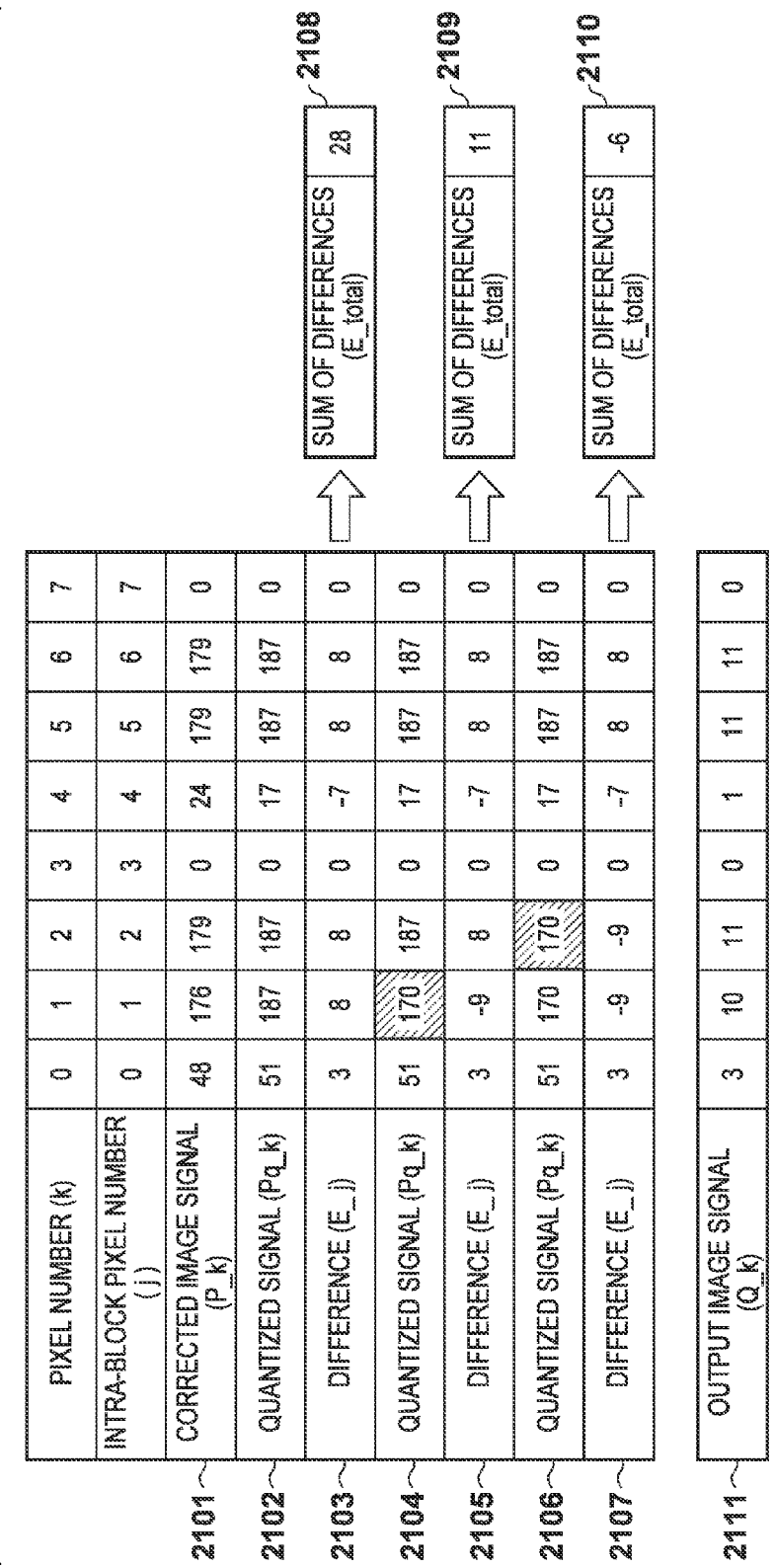

FIG. 21

| FG SIGNAL COUNT (PHASE) | DENSITY VARIATION RATIO (Dc_n) |
|---|---|
| 0 | 0.00 |
| 1 | 2.39 |
| 2 | 3.91 |
| 3 | 4.19 |
| 4 | 3.54 |
| 5 | 2.74 |
| 6 | 2.62 |
| 7 | 3.49 |
| 8 | 5.00 |
| 9 | 6.32 |
| ⋮ | ⋮ |
| 30 | -3.91 |
| 31 | -2.39 |

(TABLE D)

COMPUTATION OF DENSITY CORRECTION VALUE FROM DENSITY VARIATION RATIO 

| FG SIGNAL COUNT (PHASE) | DENSITY CORRECTION VALUE (Dcc_n) |
|---|---|
| 0 | 0.00 |
| 1 | 0.179 |
| 2 | 0.294 |
| 3 | 0.314 |
| 4 | 0.265 |
| 5 | 0.206 |
| 6 | 0.196 |
| 7 | 0.262 |
| 8 | 0.375 |
| 9 | 0.474 |
| ⋮ | ⋮ |
| 30 | -0.294 |
| 31 | -0.179 |

(TABLE E)

COMPUTATION OF DENSITY CORRECTION VALUE FOR EACH LINE BY INTERPOLATION 

| LINE NUMBER | DENSITY CORRECTION VALUE (Dq_m) |
|---|---|
| 0 | 0 |
| 1 | 1 |
| 2 | 2 |
| 3 | 3 |
| 4 | 4 |
| 5 | 4 |
| 6 | 5 |
| 7 | 5 |
| 8 | 5 |
| 9 | 5 |
| ⋮ | ⋮ |
| 6998 | -5 |
| 6999 | -5 |

(TABLE G)

COMPUTATION OF QUANTIZED DENSITY CORRECTION VALUE 

| LINE NUMBER | DENSITY CORRECTION VALUE (D_m) |
|---|---|
| 0 | 0.00 |
| 1 | 0.060 |
| 2 | 0.119 |
| 3 | 0.179 |
| 4 | 0.217 |
| 5 | 0.256 |
| 6 | 0.294 |
| 7 | 0.301 |
| 8 | 0.307 |
| 9 | 0.314 |
| ⋮ | ⋮ |
| 6998 | -0.298 |
| 6999 | -0.314 |

(TABLE F)

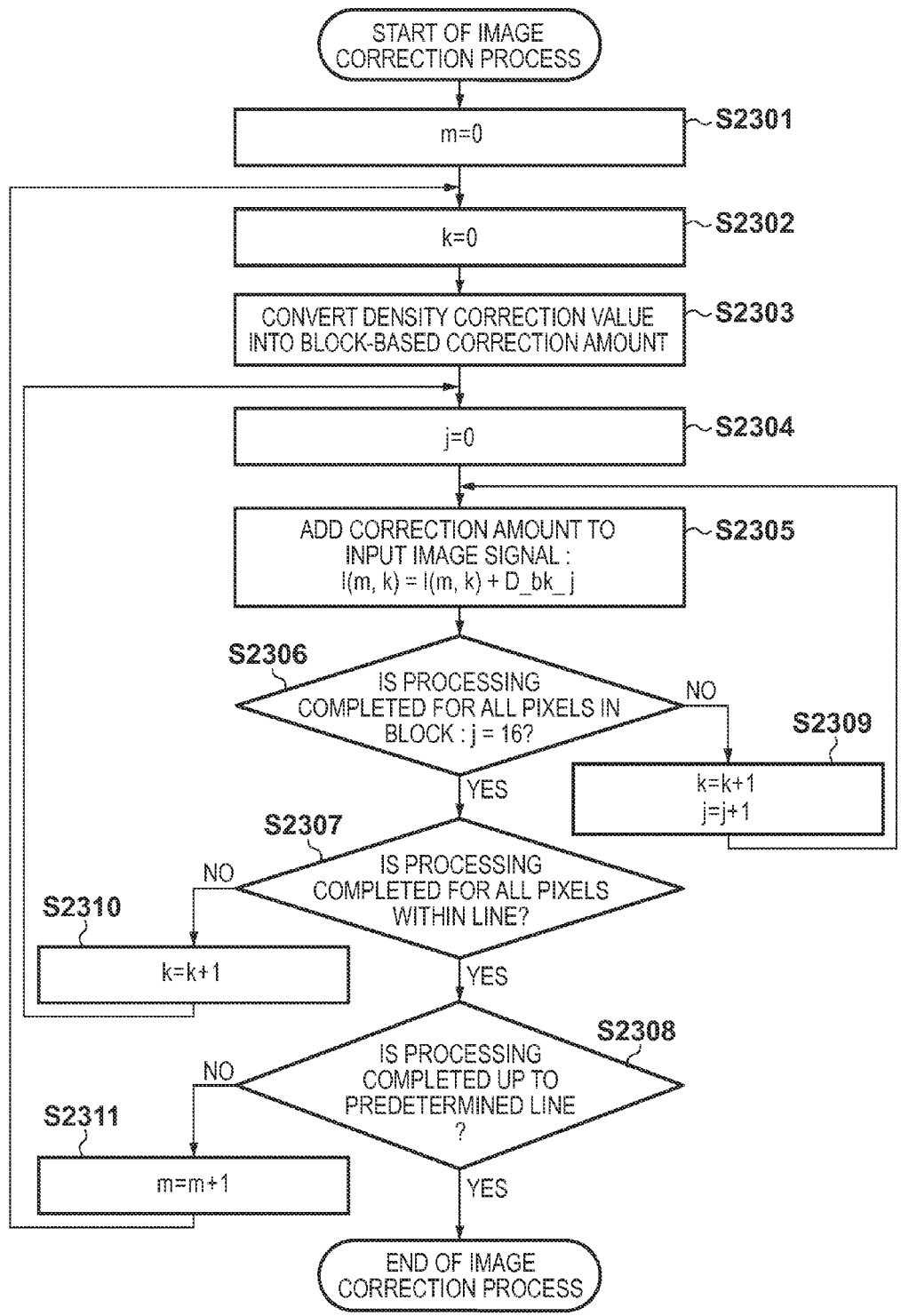

FIG. 23

| DENSITY CORRECTION VALUE | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 1/17 | 0 | 0 | 0 | 0 | 0 | 0 | 0 | 0 | 1 | 0 | 0 | 0 | 0 | 0 | 0 | 0 | 0 |
| 2/17 | 0 | 0 | 0 | 0 | 1 | 0 | 0 | 0 | 0 | 0 | 0 | 0 | 0 | 1 | 0 | 0 | 0 |
| 3/17 | 0 | 0 | 0 | 1 | 0 | 0 | 0 | 0 | 0 | 1 | 0 | 0 | 0 | 0 | 1 | 0 | 0 |
| 4/17 | 0 | 0 | 1 | 0 | 0 | 0 | 1 | 0 | 0 | 0 | 0 | 1 | 0 | 0 | 0 | 1 | 0 |
| 5/17 | 0 | 0 | 1 | 0 | 0 | 1 | 0 | 0 | 1 | 0 | 0 | 1 | 0 | 0 | 1 | 0 | 0 |

2401

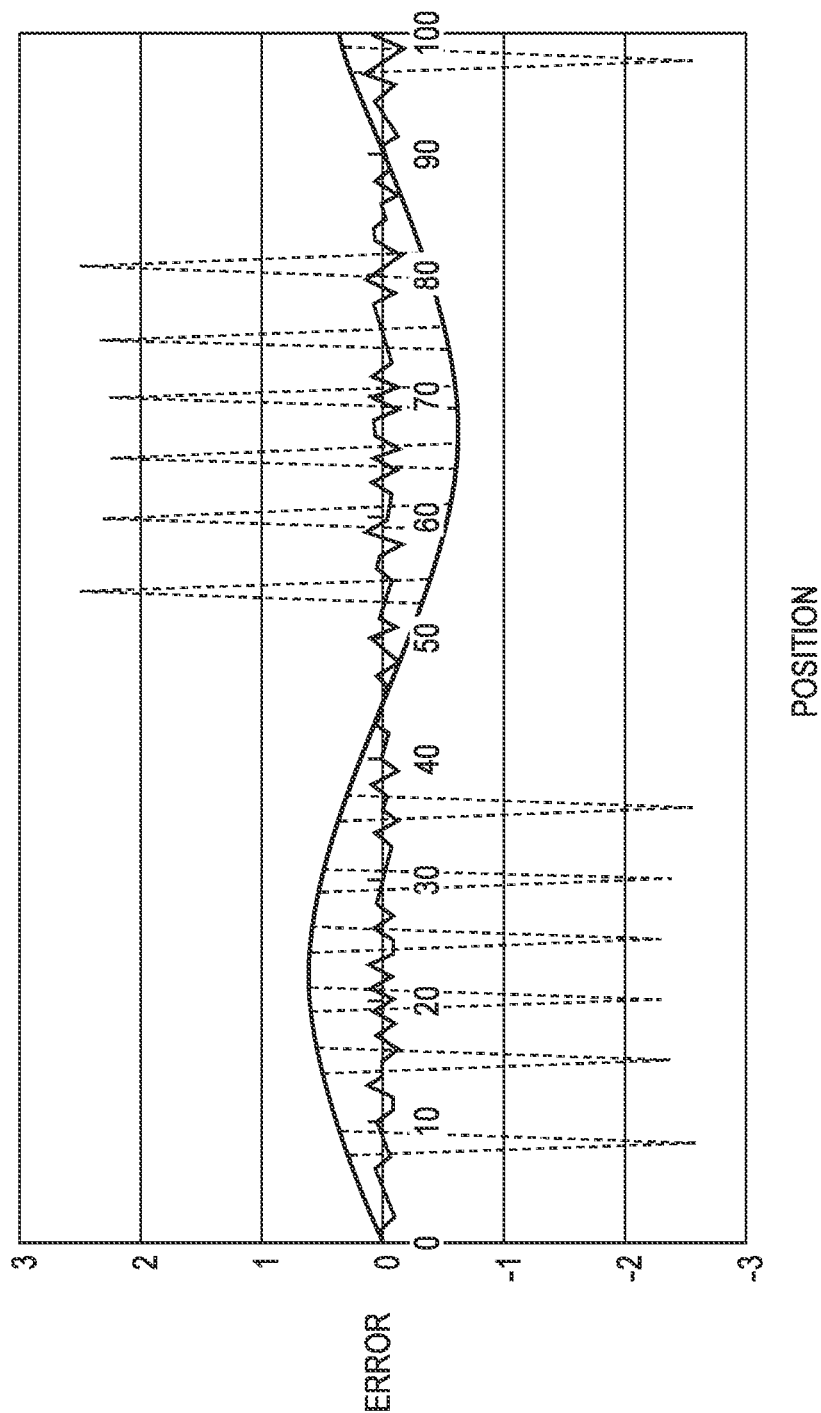

IMAGE FORMING APPARATUS

BACKGROUND OF THE INVENTION

1. Field of the Invention

The present invention relates to an image forming apparatus such as a copying machine or printer which uses an electrophotographic system or electrostatic recording system.

2. Description of the Related Art

In an image forming apparatus of the electrophotographic system, density unevenness (known as banding) occurs in the sub scanning direction of an image due to the periodic rotation unevenness of a photosensitive drum, intermediate transfer belt driving roller, development roller itself, motors and gears which drive them, or the like. More specifically, as rotation unevenness occurs in a photosensitive drum, the laser write position periodically varies. In addition, when rotation unevenness occurs in the driving roller of the intermediate transfer belt, the transfer position periodically varies. Furthermore, when rotation unevenness occurs in the development roller, the development state periodically varies. Variations in position lead to variations in scanning line interval (so-called pitch errors), which appear as density unevenness. In addition, variations in development are variations in main scanning line density, and appear as density unevenness. These periodic variations appear as banding on an image, resulting in a deterioration in print quality.

To solve this problem of banding, Japanese Patent Laid-Open No. 2007-108246 has proposed a technique of correcting an image signal so as to cancel banding, that is, a so-called banding image correction method.

Conceivable banding image correction methods include a density correction method of correcting the tones of an image in opposite directions so as to cancel density unevenness caused by the above position offsets and variations in development state and a position correction method of moving scanning positions on an image signal in opposite directions so as to cancel the above position offsets. A conceivable position correction method is a method of performing pseudo correction for less than one line by using multilevel values for PWM (Pulse Width Modulation) in addition to line-based correction.

Japanese Patent Laid-Open No. 2007-108246 has proposed a method of solving density unevenness in the sub scanning direction by the above density correction. More specifically, first of all, a density sensor measures the density unevenness of banding caused by an image forming apparatus. This method then predicts density unevenness during image formation from the measured density unevenness, and corrects an image signal so as to cancel the density unevenness. When, for example, density correction is performed before halftone processing, the corrected state may not be stored depending on the subsequent halftone processing, resulting in a failure to reduce banding. In addition, performing the above position correction will make the above problem more noticeable. It is therefore necessary to perform banding image correction after halftone processing. On the other hand, in order to reduce the amount of data transferred, save memory, and reduce the cost of a PWM circuit, the number of bits of an image signal after halftone processing is preferably smaller than that before halftone processing.

If, however, the number of bits of an image signal is small, since the resolution is not high enough to reflect a correction amount, the correction accuracy becomes insufficient. This rather worsens the image quality. For example, horizontal streaks appear due to correction errors. FIG. 24 shows examples of pitch errors as correction results obtained when the above position correction is performed for banding caused by pitch errors of a given period after halftone processing, and the resultant correction amounts are quantized into 8-bit data each and 4-bit data each. Obviously, the 8-bit quantization (solid line) for the original pitch errors (thick line) suppresses the pitch errors to almost 0, whereas the 4-bit quantization (broken line) produce sudden large pitch errors, which cause a deterioration in image quality in the form of sudden streaks. That is, the smaller the number of bits expressing a correction amount, the larger a quantization error.

SUMMARY OF THE INVENTION

One aspect of the present invention provides an image forming apparatus comprising: a correction amount determination unit which determines a correction amount for an image signal so as to correct banding as periodic density unevenness in a sub scanning direction; an image correction unit which corrects each pixel value of an n-bit image signal in accordance with the correction amount determined by the correction amount determination unit and outputs the image signal as a first corrected image signal; and a quantization unit which quantizes, for each pixel, the first corrected image signal corrected by the image correction unit into a second corrected image signal of m bits smaller than n bits, wherein the quantization unit diffuses, in a main scanning direction, quantization errors at the time of quantization of the first corrected image signal into the second corrected image signal so as to cancel the quantization errors within a predetermined region including a plurality of continuous pixels on a main scanning line.

Another aspect of the present invention provides an image forming apparatus comprising: a correction amount determination unit which determines a correction amount for an image signal so as to correct banding as periodic density unevenness in a sub scanning direction; a quantization unit which quantizes the correction amount determined by the correction amount determination unit from n bits to m bits smaller than the n bits; a conversion unit which converts the correction amount quantized by the quantization unit into a modified correction amount indicating a correction amount for each block including a plurality of continuous pixels in a main scanning direction; and an image correction unit which corrects the image signal by adding a block-based modified correction amount converted by the conversion unit to a pixel of an m-bit image signal which corresponds to the block, wherein the conversion unit performs conversion such that an average value of block-based modified correction amounts becomes nearest to a correction amount.

Further features of the present invention will become apparent from the following description of exemplary embodiments (with reference to the attached drawings).

BRIEF DESCRIPTION OF THE DRAWINGS

FIG. 2 shows the arrangement of a density sensor;
FIGS. 3A to 3E show the arrangement of a motor;
FIG. 4 shows signal processing units;
FIG. 7 is a flowchart for the creation of an output correction table;
FIG. 8 is a timing chart showing how an FG signal is reset;
FIG. 9 shows how a test patch is exposed and detected;
FIG. 10 shows an exposure timing;
FIGS. 11A to 11C show correction tables;

FIG. 12 is a graph showing correction table interpolation;

FIG. 17 shows quantized values;

FIG. 18 shows density correction and correction amount modification;

FIG. 20 is a view showing another correction amount modification;

FIG. 21 is a view showing other correction tables;

FIG. 22 is a flowchart showing another image correction;

FIG. 23 is a view showing another image correction; and

FIG. 24 is a view showing a problem in a comparative example.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Forming Apparatus

Figure 1:
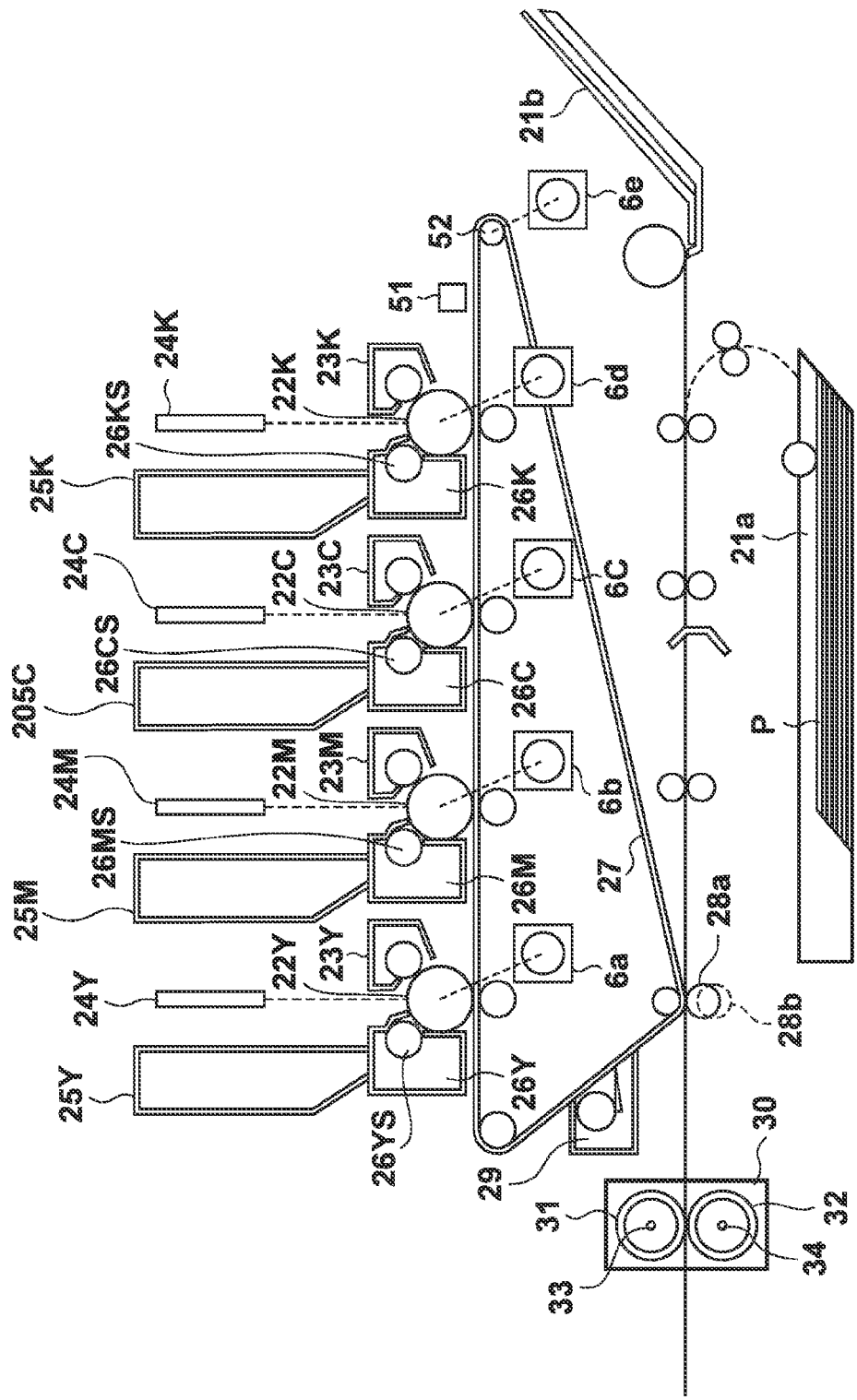
FIG. 1 is a sectional view of an image forming apparatus.

An example of the arrangement of an image forming apparatus according to the present invention will be described first with reference FIG. 1. First of all, this image forming apparatus forms an electrostatic latent image by exposure light emitted based on the image information supplied from an image processing unit, and forms a single-color toner image by developing the electrostatic latent image. The apparatus then forms single-color toner images of the respective colors, superimposes them, and transfers them onto a printing medium P. The apparatus fixes the multicolor toner image on the printing medium P, and delivers it outside the apparatus. This operation will be described in detail below.

First of all, the printing medium P is fed from a paper feed unit 21a or 21b. Photosensitive drums (image carriers) 22, i.e., 22Y, 22M, 22C, and 22K, are formed by coating the outer surface of aluminum cylinders with organic photoconductive layers, which rotate upon reception of driving force from driving motors 6a to 6d (not shown). Injection chargers 23, i.e., 23Y, 23M, 23C, and 23K, charge the photosensitive drums 22. The four injection chargers 23Y, 23M, 23C, and 23K respectively correspond to yellow (Y), magenta (M), cyan (C), and black (K). Each injection charger 23 includes a sleeve indicated by the circular section. Scanner units 24Y, 24M, 24C, and 24K output exposure light. Selectively exposing the surfaces of the photosensitive drums 22Y, 22M, 22C, and 22K to light will form electrostatic latent images. Note that the photosensitive drums 22Y to 22K each rotate with a predetermined decentering component. At the time of the formation of electrostatic latent images, however, the phase relationship between the respective photosensitive drums 22 has already been adjusted to exert the same decentering influence on the transfer unit. Developing devices 26, i.e., 26Y, 26M, 26C, and 26K, form developer images by developing the electrostatic images using the developers supplied from toner cartridges 25Y, 25M, 25C, and 25K. The four developing devices 26Y, 26M, 26C, and 26K respectively correspond to yellow (Y), magenta (M), cyan (C), and black (K). The respective developing devices are provided with sleeves 26YS, 26MS, 26CS, and 26KS. In addition, the respective developing devices are detachably mounted in the image forming apparatus.

An intermediate transfer member 27 is in contact with the photosensitive drums 22Y, 22M, 22C, and 22K. A driving roller 52 of the intermediate transfer member rotates the intermediate transfer member 27 clockwise at the time of image formation. As the photosensitive drums 22Y, 22M, 22C, and 22K rotate, the respective toner images are superimposed and transferred onto the intermediate transfer member 27. A transfer roller 28 then comes into contact with the intermediate transfer member 27 to convey the printing medium P while clamping it between them. Consequently, the multicolor toner image on the intermediate transfer member 27 is transferred onto the printing medium P. The transfer roller 28 abuts against the printing medium P at a position 28a while transferring the multicolor toner image onto the printing medium P. After the transfer processing, the transfer roller 28 moves away from the printing medium P to a position 28b.

A fixing device 30 fuses and fixes the transferred multicolor toner image while conveying the printing medium P. As shown in FIG. 1, the fixing device 30 includes a fixing roller 31 which heats the printing medium P and a pressure roller 32 for pressing the printing medium P against the fixing roller 31. The fixing roller 31 and the pressure roller 32 are formed into hollow shapes, and respectively incorporate heaters 33 and 34. That is, the fixing roller 31 and the pressure roller 32 convey the printing medium P holding the multicolor toner image, and fix the toner on the surface of the printing medium P by heating and pressing it.

A delivery roller delivers the printing medium P, after the toner image is fixed, onto a delivery tray. The apparatus then terminates the image forming operation. A cleaning unit 29 cleans the toner remaining on the intermediate transfer member 27. The waste toner after the transfer of the multicolor toner image of four colors formed on the intermediate transfer member 27 onto the printing medium P is stored in a clearer container. A density sensor 51 is placed in the image forming apparatus in FIG. 1 so as to face the intermediate transfer member 27. The density sensor 51 measures the density of each toner patch formed on the surface of the intermediate transfer member 27 and outputs a density detection signal.

Although this embodiment will exemplify an image forming apparatus including the intermediate transfer member 27, the present invention can also be applied to an image forming apparatus using the primary transfer system designed to directly transfer the toner images (developer images) developed on the photosensitive drums 22 onto a printing medium. In this case, replacing the intermediate transfer member 27 with a printing medium convey belt (printing medium carrier) can practice the present invention. Referring to the sectional view shown in FIG. 1, each photosensitive drum 22 is provided with a motor 6 as a driving unit. However, the plurality of photosensitive drums 22 may share the motor 6. In the following description, in contrast to the main scanning direction of an image, for example, a direction perpendicular to the main scanning direction when viewed from above, for example, the conveying direction of a printing medium or the rotating direction of the intermediate transfer member will be referred to as a conveying direction or a sub scanning direction.

<Arrangement of Density Sensor 51>

An example of the density sensor 51 such as an optical characteristic detection sensor will be described next with reference to FIG. 2. As indicated by 2a in FIG. 2, the density sensor 51 includes an LED 8 as a light-emitting element and a phototransistor 10 as a light-receiving element. The light emitted from the LED 8 passes through a slit 9 for suppressing diffused light, and reaches the surface of the intermediate transfer member 27. The phototransistor 10 receives the specular light component after an opening portion 11 suppresses the irregularly reflected light.

In FIG. 2, 2b shows the circuit arrangement of the density sensor 51. A register 12 divides a voltage to the phototransistor 10 and Vcc. A resistor 13 limits the current which drives the LED 8. A transistor 14 turns off the LED 8 in accordance with a signal from a CPU 401. In the circuit shown in 2b in FIG. 2, the larger the amount of specular light from a toner image upon irradiation with light from the LED 8, the larger a current flowing in the phototransistor 10, and the larger the value of a voltage V1 detected as "OutPut". In other words, in the arrangement shown in 2b in FIG. 2, when the density of a patch is high and the amount of specular light is large, the detected voltage V1 is high, and vice versa.

<Arrangement of Motor 6>

The arrangement of the motor as a banding source to be corrected will be described next with reference to FIGS. 3A to 3E. The general arrangement of the motor 6 will be described first with reference to FIGS. 3A to 3D. The mechanism of periodic rotation unevenness occurring in the motor 6 will be described with reference to FIG. 3E. The following will exemplify the motor as a rotation member as a banding source. However, a banding source is not limited to this. For example, a belt driving roller, photosensitive drums, development roller, and the like can be assumed as banding sources as long as they are rotation members associated with image formation.

Explanation of General Arrangement of Motor

First of all, in FIGS. 3A to 3C respectively show, as an example, a sectional view of the motor 6, a front view of the motor 6, and an extracted view of a circuit board 303. Note that the motors 6 can be made equivalent to various motors included in the imaging forming units such as the motors 6a to 6d which drive the photosensitive drums 22 described above and the motor 6e which drives the driving roller 52.

Referring to FIGS. 3A and 3B, a rotor magnet 302 formed from a permanent magnet is bonded to the inner side of a rotor frame 301. Coils 309 are wound around stators 308. The plurality of stators 308 are arranged along the inner circumferential direction of the rotor frame 301. A shaft 305 transmits rotational force outside. More specifically, the shaft 305 is fabricated into a gear or a gear made of a resin such as POM is fitted on the shaft 305 to transmit rotational force to a mating gear. Bearings 306 are fixed to a housing 307, which is fitted in a mount plate 304.

An FG patch (speed patch) 310 is printed in an annular form on the surface, of the circuit board 303 shown in FIG. 3C, which is located on the rotor side so as to face an FG (Frequency Generator) magnet 311. Circuit components (not shown) for driving control are mounted on the other surface of the circuit board 303. The circuit components for driving control include a control IC, a plurality of (for example, three) Hall elements, resistor, capacitor, diode, and MOSFET. The control IC (not shown) rotates the rotor frame 301 and each part connected to it by switching the coils in which a current is to flow and the direction of the current based on the position information (Hall element outputs) of the rotor magnet 302.

Figure 3D:
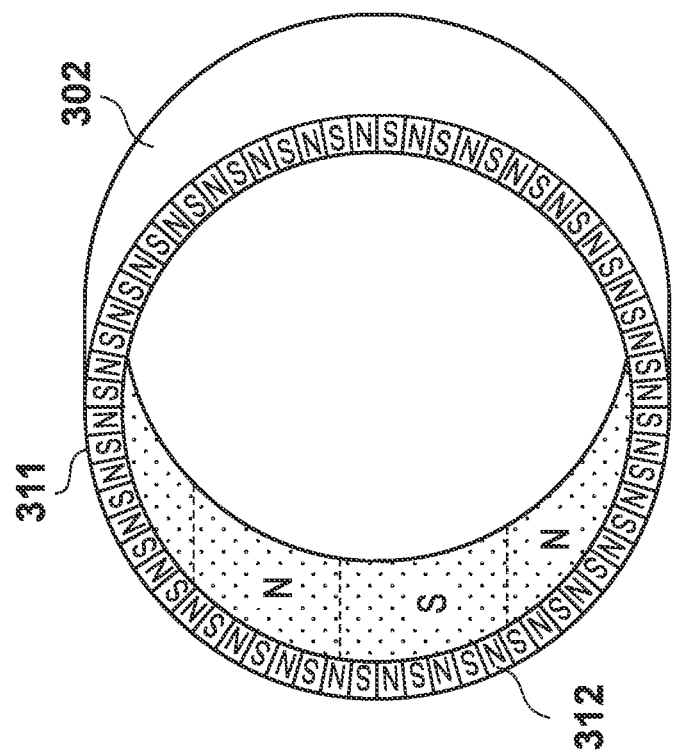

FIG. 3D shows an extracted view of the rotor magnet 302. The inner surface of the rotor magnet 302 is magnetized in the manner indicated by reference numeral 312, and the open end face of the rotor magnet 302 is magnetized by the FG magnet 311. In this embodiment, the rotor magnet 302 has driving magnetizations of eight poles (four N poles and four S poles). Ideally, the N- and P-pole magnetizations 312 are alternately arranged. On the other hand, the FG magnet 311 is magnetized into N and S poles larger in number than the driving magnetizations (in this embodiment, 32 pairs of N and S poles). Note that the FG patch 310 indicated by FIG. 3C has rectangles equal in umber to the magnetizations of the FG magnet 311, which are connected in series in an annular form. Obviously, the numbers of driving magnetizations and FG magnets are not limited to those described above, and they can be applied in other forms.

The motor exemplified by FIGS. 3A to 3E uses, as a speed sensor for the motor, a sensor of the frequency generator system of generating a frequency signal proportional to a rotational speed, that is, the FG system. This system will be described below. When the FG magnet 311 rotates integrally with the rotor frame 301, a sine wave signal having a frequency corresponding to a rotational speed is induced in the FG patch 310 due to magnetic flux changes relative to the FG magnet 311. The control IC (not shown) generates a pulsed FG signal by comparing the generated inductive voltage with a predetermined threshold. The control IC then performs speed/driving control on the motor 6 and various kinds of processes (to be described later) based on the generated FG signal. Note that a speed sensor for the motor is not limited to the frequency generator type, and it is possible to use an encoder type sensor such as an MR sensor or slit-plate type sensor.

Although described later, it is assumed that in this embodiment, the rotation unevenness of the motor is linked to density unevenness (banding). That is, when predicting what kind of periodic density unevenness is generated, this apparatus uses the rotation phase of the rotation unevenness of the motor as a parameter. The CPU 401 (to be described later) specifies the rotation phase of rotation unevenness based on the FG signal output from the motor 6.

Mechanism of Generation of Rotation Unevenness of Motor

Figure 3E:
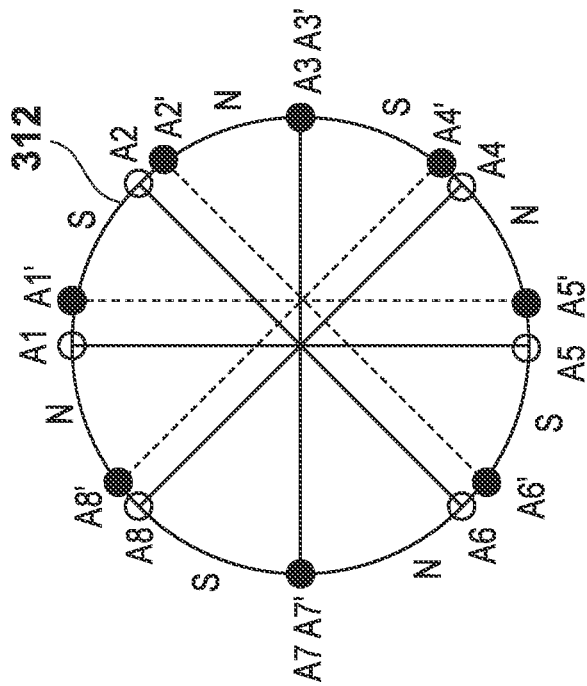

In general, the form of rotation unevenness of a one-rotation period of the motor is determined by the structure of the motor. Typically, for example, the form of rotation unevenness of a one-rotation period of the motor is determined by two factors including the magnetized state of the rotor magnet 302 (magnetization fluctuations corresponding to one rotation of the rotor) and the offset between the center positions of the rotor magnet 302 and stator 308. This is because the total motor driving force generated by all the stators 308 and all the rotor magnets 302 changes during one period of the motor 6 due to the two factors. Fluctuations in magnetization will be described below with reference to FIG. 3E. FIG. 3E shows a view of the magnetizations 312 when viewed from the front. Reference symbols A1 to A8 and A1' to A8' denote the boundaries where the poles change. The boundaries A1 to A8 plotted at equal intervals along the circumference indicate the boundaries between the N and S poles without any magnetization fluctuations. The boundaries A1' to A8' indicate the boundaries between the N and S poles with magnetization fluctuations.

In addition, the decentering of the motor shaft (pinion gear) 305 can be counted as one factor for the rotation unevenness of the motor. This rotation unevenness is transmitted to the rotating mating part. This unevenness appears as density unevenness. The decentering of the motor shaft (pinion gear) 305 also depends on a one-rotation period of the motor 6. The rotation unevenness obtained by combining this rotation unevenness with the rotation unevenness due to the above magnetization fluctuations is transmitted to the driving power destination, and appears as density unevenness. This is the typical mechanism of the occurrence of rotation unevenness of a one-rotation period of the motor.

In addition, the motor 6 also produces rotation unevenness of a period other than the above rotation unevenness of a one-rotation period. In the motor having eight driving magnetic poles magnetized on the rotor magnet 302, the respective Hall elements (not shown) detect magnetic flux changes corresponding to four periods per rotation of the motor because of the four pairs of N and S poles. If the position of any of the Hall elements shifts from the ideal position, the phase relationship between outputs from the respective Hall elements deteriorates with a one-period magnetic flux change. Consequently, the switching timing shifts in the motor driving control operation of switching excitation to the coil wound around the stator based on outputs from the respective Hall elements. This causes rotation unevenness of a ¼ period of a one-rotation period of the motor 6 four times during one rotation of the motor 6. Obviously, this causes rotation unevenness of a period of a fraction of an integer (a frequency of an integer multiple) corresponding to the number of poles of driving magnetizations of the rotor magnet 302.

<Hardware Arrangement Associated with Signal Processing>

A hardware arrangement associated with signal processing will be described next with reference to FIG. 4. In this case, a density signal processing unit 405 and an FG signal processing unit 406 each are formed from, for example, an application specific integrated circuit (ASIC) or SOC (System On Chip). The CPU 401 performs various control operations in cooperation with the respective blocks, namely a storage unit 402, an image forming unit 403, the FG signal processing unit 406, the density signal processing unit 405, and the density sensor 51. The CPU 401 also performs various kinds of computation processing based on input information.

The storage unit 402 includes an EEPROM and a RAM. The EEPROM stores the correspondence relationship between a count value (corresponding to a phase signal from the motor) identifying an FG signal as a phase signal from the motor 6 and correction information for correcting image density in a rewritable form. The EEPROM also stores other kinds of setting information used for image formation control by the CPU 401. The RAM of the storage unit 402 is used to temporarily store information when the CPU 401 executes various kinds of processing. The image forming unit 403 is a generic term of each member associated with the image formation described with reference to FIG. 1. A detailed description of this unit will be omitted. The density sensor 51 is the same as that described with reference to FIG. 2.

The density signal processing unit 405 receives a density detection signal from the density sensor 51, and supplies (outputs) the input signal to the CPU 401 without or with processing to allow the CPU 401 to easily extract density unevenness associated with the motor 6 of interest. On the other hand, the FG signal processing unit 406 receives the FG signal output from the motor 6, described with reference to FIGS. 3A to 3E, and performs processing associated with the FG signal. For example, the FG signal processing unit 406 processes the FG signal to allow the CPU 401 to specify the phase of the motor, and outputs the processed signal to the CPU 401, or notifies the CPU 401 of the determination result on processing associated with the FG signal.

According to this embodiment, the CPU 401 creates a table associating the rotational phase of the motor and correction information for density correction (banding correction) based on the density signal output from the density signal processing unit 405 and the phase signal output from the FG signal processing unit 406. The CPU 401 also causes a scanner unit 24 to perform exposure reflecting image correction in accordance with the phase of rotation unevenness of the motor 6 in synchronism with a change in the phase of the motor 6 which is specified based on the FG signal supplied from the FG signal processing unit 406. The details of this operation will be described with reference to the flowchart described later.

<Arrangement of Density Signal Processing Unit 405>

Figure 5:
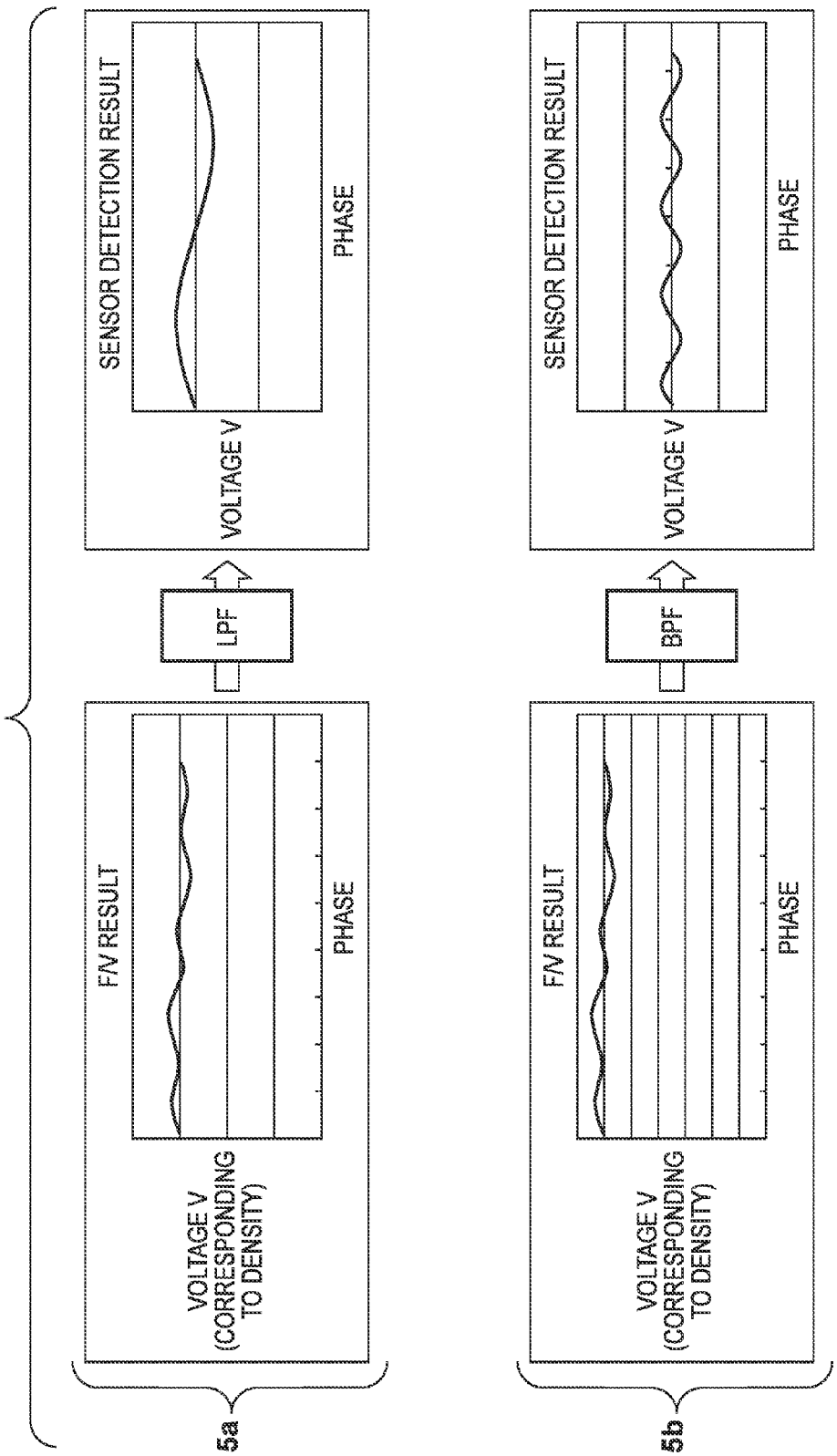
FIG. 5 shows sensor signals.

The density signal processing unit 405 described with reference to 4a in FIG. 4 will be described in detail next with reference to 4b in FIG. 4. A low-pass filter (LPF) 407 selectively transmits a signal of a specific frequency component. The cutoff frequency of the filter is set to mainly transmit signals equal to or less than a frequency component (to be referred to as a W1 component hereinafter) in one rotation of the motor and attenuate a signal of a frequency of an integer multiple of the W1 component. In FIG. 5, 5a shows an example of the operation of the LPF. Causing a density sensor output to pass through the LPF can easily extract the density unevenness of the W1 component.

A bandpass filter (BPF) 408 can extract a predetermined frequency component from an output from the density sensor 51. For example, this embodiment is configured to extract rotation unevenness of a frequency four times the frequency of one rotation of the motor (¼ period: to be referred to as a W4 component hereinafter). For the filter characteristics, two cutoff frequencies are provided on the two sides of the frequency of a W4 component. In FIG. 5, 5b shows an example of the operation of the BPF. Causing a density sensor output to pass through the BPF can easily extract density unevenness of a W4 component.

The density signal processing unit 405 also supplies, to the CPU 401, raw sensor output data which is a detection result from the density sensor 51 from which no rotation unevenness component of the motor is removed. For example, the CPU 401 uses this raw sensor output data when calculating the average detection value of the density sensor 51.

Although described in later, the CPU 401 in this embodiment calculates a correction value for correcting density unevenness based on both a W1 component and a W4 component due to the rotation unevenness of the motor. The storage unit 402 stores the calculated correction value in association with the count value of an FG signal as a phase signal to allow the use of the correction value in accordance with the rotation phase of the motor 6 at the time of image formation (exposure). In this case, it is possible to associate the phase of the rotation unevenness of the motor 6 with a given state in the periodic rotational speed variations of the motor 6. A change in the phase of the rotation unevenness of the motor indicates a change in the speed of the motor 6 from a previous given speed state.

<Arrangement of FG Signal Processing Unit 406>

The FG signal processing unit 406 described with reference 4a in FIG. 4 will be described in detail next with reference to 4c in FIG. 4. An F/V converter 409 performs frequency analysis of an acquired FG signal. More specifically, the FG signal processing unit 406 measures the pulse period of the FG signal, and outputs a voltage corresponding to the period. The cutoff frequency of a low-pass filter 410 is set to transmit frequencies equal to or less than a W1 component and attenuate frequencies higher than a W1 component. Note that the FG signal processing unit 406 may be provided with an FFT analysis unit, in place of the F/V converter 409 and the low-pass filter 410, to perform frequency analysis of an FG signal. An SW 411 is a switch for switching whether to input the signal output from the low-pass filter 410 to a determination unit 412. An SW control unit 413 turns on the SW 411 in accordance with an initialization signal, and turns off the SW 411 in accordance with an FG counter signal input next after the completion of resetting operation.

The determination unit 412 acquires signals corresponding to one period of the motor, which are input from the low-pass filter 410, and calculates the average value of the signals. Upon calculating the average value, the determination unit 412 compares the average value with the value input from the low-pass filter 410, and outputs a counter reset signal when a predetermined condition holds. The counter reset signal is input to the SW control unit 413 and an FG counter 414. In addition, the counter reset signal is sent to the CPU 401 to notify it of the completion of resetting operation.

The FG counter 414 counts up the number of FG pulses corresponding to one period of the motor to perform toggling. In this embodiment, when the motor makes one rotation, an FG signal having 32 pulses is output. The FG counter 414 counts 0 to 31. In addition, upon receiving a counter reset signal, the FG counter 414 resets to "0".

<Main Hardware Arrangement and Function Arrangement>

Figure 6:
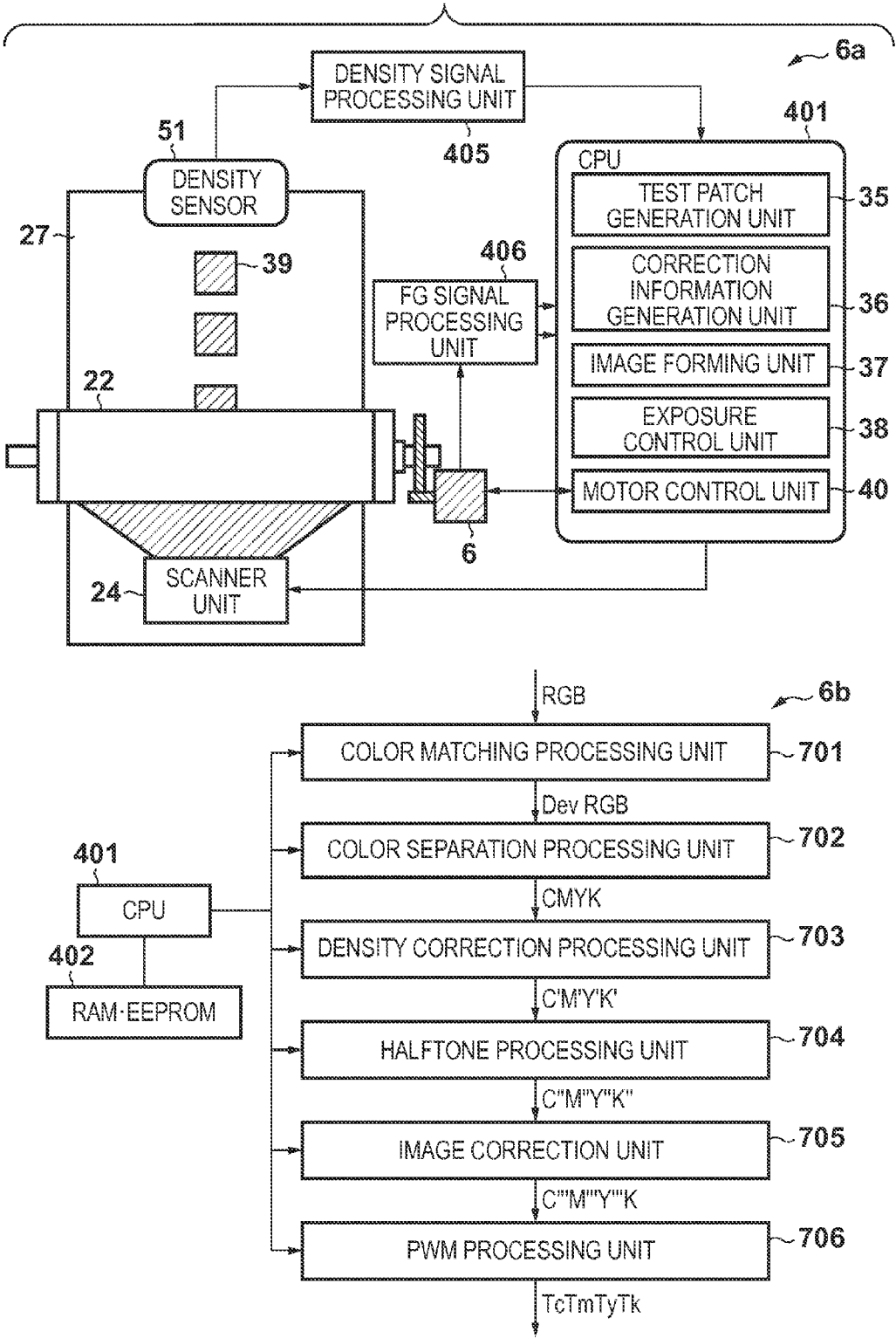
FIG. 6 shows the overall arrangement of a system.

The main hardware arrangement and function arrangement of this embodiment will be described next with reference to (a) in FIG. 6. In FIG. 6, 6a shows the relationship between some members of the image forming apparatus, some of the block diagrams shown in FIG. 4, and the functional block diagram controlled by the CPU 401. Note that the same reference numerals denote the same components in FIGS. 1 and 4, and a detailed description of them will be omitted.

Referring to 6a in FIG. 6, a test patch generation unit 35 functions as a patch forming unit and controls a forming function for a patch image (to be referred to as a test patch hereinafter) 39 formed by a toner image for the detection of a density on the intermediate transfer member 27. The test patch generation unit 35 forms an electrostatic latent image on the photosensitive drum 22 by the scanner unit 24 based on the data of a test patch. The test patch generation unit 35 then forms a toner image (test patch) based on the electrostatic latent image formed by a developing unit (not shown) on the intermediate transfer member 27. The density sensor 51 irradiates the test patch 39 formed on the intermediate transfer member 27 with light, detects the reflected light characteristic of the light, and inputs the detection result to the density signal processing unit 405.

A correction information generation unit 36 generates density correction information based on the detection result on the test patch 39 which is detected by the density sensor 51. This operation will be described in detail later with reference to FIGS. 11A to 11C. An image processing unit 37 executes image processing such as halftone processing for various types of images. The arrangement of the image processing unit 37 will be described later. An exposure control unit 38 causes the scanner unit 24 to perform exposure in synchronism with an FG count value to form a test patch on the intermediate transfer member 27 through an electrophotographic process.

The form shown in FIGS. 4 and 6a in FIG. 6 is an example, and the present invention is not limited to this arrangement example. For example, it is possible to make an application specific integrated circuit bear some or all of the functions born by the CPU 401 in FIGS. 4 and 6a in FIG. 6. In contrast to this, it is possible to make the CPU 401 bear some or all of the functions born by the application specific integrated circuit in FIGS. 4 and 6a in FIG. 6.

<Arrangement of Image Processing Unit 37>

An example of the arrangement of the image processing unit 37 will be described next with reference to 6b in FIG. 6. When printing operation starts in response to a print instruction from a host computer or the like, a color matching processing unit 701 performs color conversion processing by using a color matching table prepared in advance. More specifically, the color matching processing unit 701 converts an RGB signal representing the color of the image sent from the host computer into a device RGB signal (to be referred to as DevRGB hereinafter) in accordance with the color reproduction region of the image forming apparatus. A color separation processing unit 702 converts the DevRGB signal into a CMYK signal representing the color of a toner (coloring material) in the imaging forming apparatus.

A density correction processing unit 703 reads a density correction table for correcting tone/density characteristics stored in the storage unit 402 in accordance with an instruction from the CPU 401, and converts the above CMYK signal into a C'M'Y'K' signal having undergone tone/density characteristic correction by using this density correction table. In this embodiment, the C'M'Y'K' signal has a data length of 8 bits.

Subsequently, a halftone processing unit 704 performs halftone processing for the C'M'Y'K' signal. The halftone processing unit 704 performs multilevel dither processing, and converts the input 8-bit signal into a 4-bit C"M"Y"K" signal. Thereafter, an image correction unit 705 which performs banding correction (to be described later) performs banding correction processing to obtain a 4-bit C'''M'''Y'''K''' signal. According to this embodiment, the image correction unit 705 converts a 4-bit (m-bit) image signal after halftone processing into an 8-bit (n-bit) expression, and then executes banding image correction. Thereafter, the image correction unit 705 quantizes the 8-bit correction signal into a 4-bit correction signal. In this case, this embodiment disperses quantization errors so as to cancel them in a predetermined region including a plurality of continuous pixels for each main scanning line. These methods will be described in detail later. A PWM processing unit 706 converts the above C'''M'''Y'''K''' signal into exposure times Tc, Tm, Ty, and Tk of the scanner units 24C, 24M, 24Y, and 24K by using a PWM (Pulse Width Modulation) table.

<Output Correction Table Creation Processing>

A procedure for output correction table creation processing will be described next with reference to FIG. 7. The processing described above will specify the correspondence relationship between phase signals from the motor and density unevenness, compute density correction information for the density unevenness, and create a correspondence table between the phase signals from the motor and density correction information. The created table is used to reduce banding at the time of the subsequent execution of printing. This operation will be described in detail below.

First of all, in step S801, a motor control unit 40 starts processing in an output correction adjustment mode. In step S802, the motor control unit 40 checks whether the motor falls within a predetermined range of numbers of revolutions. Upon checking this, the motor control unit 40 changes the setting of a control gain 42 of a speed control unit 43 to the minimum value. Note that in gain setting, it is possible to set the gain to at least a set value lower than that in normal image forming operation instead of the minimum value. Setting the gain in this manner will increase rotation unevenness corresponding to a one-rotation period of the motor, thereby facilitating the detection of the unevenness. In this case, the normal image forming operation indicates, for example, image forming operation based on the image information which is input from a computer outside the image forming apparatus and is created in accordance with user's computer operation.

Subsequently, in step S803, the CPU 401 turns on the SW 411 via the SW control unit 413 to start counting a motor FG signal in order to detect the rotational phase of the motor. In step S804, the determination unit 412 extracts outputs from the F/V converter 409, that is, rotation unevenness corresponding to a one-rotation period of the motor which has been processed by the LPF 410, and averages them.

In step S805, the determination unit 412 determines whether the motor rotation unevenness phase of a W1 component has become a predetermined phase. In this case, the determination unit 412 checks whether the rotation unevenness phase of the motor 6 has become 0. Upon determining YES in step S805, the determination unit 412 issues a counter reset signal to reset the FG counter 414 in step S806. In step S806, the CPU 401 starts observing the count of an FG signal as a motor phase signal. The count of the FG signal specifies the phase of the motor 6. The CPU 401 keeps observing the count value of the FG signal to the end of a print job.

In step S807, the motor control unit 40 returns the setting of the control gain 42 from the minimum value to the initial set value. This operation can set the same condition as that in normal image forming operation in terms of the control gain 42 in test patch forming operation. In step S808, the test patch generation unit 35 generates test patch data for the patch 39.

In step S809, the test patch generation unit 35 determines whether the count value of the FG signal from the motor has become a predetermined value (for example, "0"). If YES in step S809, the test patch generation unit 35 causes the scanner unit 24 to start performing exposure using in step S810. Note that this apparatus performs no image correction at the time of the formation of a test patch. More specifically, the test patch generation unit 35 forms a pre-patch and a normal patch at this time. In this case, a pre-patch is formed at a position preceding a normal patch by a predetermined distance to generate the timing to start measuring the density of the normal patch by the density sensor 51. The normal patch has a length corresponding to one rotation of the motor 6 in the sub scanning direction.

In step S811, the density sensor 51 detects reflected light obtained from the test patch formed on the intermediate transfer member 27. In this case, the detection result obtained by the density sensor 51 is input to the CPU 401 via the density signal processing unit 405. Three kinds of signals are input to the CPU 401, as described with reference to 4b in FIG. 4.

The correction information generation unit 36 functions as a correction amount determination unit. In step S812, the correction information generation unit 36 calculates density correction information for reducing density unevenness due to the rotation unevenness of the motor based on the detection result obtained in step S811. In addition, the correction information generation unit 36 stores the calculated density correction information in the EEPROM. In the processing in step S811, as described with reference 4b in FIG. 4, the LPF 407 and the BPF 408 respectively detect W1 and W4. Note that the start timing of the detection of reflected light from the W4 component is the same as that from the W1 component. In step S812, the correction information generation unit 36 computes correction information for correcting the unevenness of each of the W1 and W4 components based on the density unevenness of the W1 and W4 components. Upon completing the processing in each step described above, the apparatus terminates the processing for exposure output correction table creation in step S813.

<Processing of Associating Motor Phase with Density Variation of Toner Image>

The processing in steps S802 to S806 in FIG. 7 will be described in detail next with reference to FIG. 8. FIG. 8 is a timing chart showing an embodiment of reset processing for a motor FG counter value. The timing chart shown in FIG. 8 allows to determine which speed variation state of the motor 6 is to be associated which phase (phase zero (FG 0) in this case). In the case shown in FIG. 8, a state in which the speed of the motor crosses the average value in the process of changing from a speed higher than the average to a speed lower than the average is assigned to phase zero (FG 0). Note the case shown in FIG. 8 is an example, and it is possible to assign an arbitrary or predetermined speed variation state of the motor 6 to any phase (for example, phase zero (FG 0)). That is, an arbitrary or predetermined speed state of the motor 6 may be assigned to any phase (arbitrary or predetermined phase) of the motor 6, on the premise of reproducibility, so as to allow the phase assigned with the state to be specified in subsequent processing. This makes it possible to perform various types of processing at other timings by using any phase of the motor 6 as a parameter. This operation will be described in detail below.

First of all, when the CPU 401 outputs an initialization signal to the FG signal processing unit 406 at t0, and the signal is transmitted to the SW control unit 413. The SW control unit 413 turns on the SW 411 in synchronism with the FG signal input first after t0 (S803).

In the interval between t1 and t2 (corresponding to one rotation of the FG signal motor), the determination unit 412 calculates an average value Vave input values from the low-pass filter 410. The determination unit 412 compares the average value Vave with the value input from the low-pass filter 410 after t2, and outputs a counter reset signal at timing t3 (YES in step S805) at which a predetermined condition holds, for example, the input value crosses the average value Vave in the process of changing from a value larger than the average value to a value smaller than the average value. Upon receiving a counter reset signal at timing t3, the FG counter 414 resets the count to "0" (S806). Upon receiving the counter reset signal, the CPU 401 recognizes the completion of the initialization of a phase signal (FG count value).

The exposure timing for a patch image (test patch), that is, the processing in step S808 in FIG. 7, will be described in detail next with reference to 9a in FIG. 9. Assume that in the timing chart of 9a in FIG. 9, the CPU 401 keeps counting the FG signal from the processing in FIG. 8. That is, this operation is based on the premise that the CPU 401 continuously specifies the rotation unevenness phase of the motor 6 in accordance with changes in FG counter value. The details of the processing shown in 9a in FIG. 9 will be described below.

A test patch will be defined in detail first. As described above, the test patch includes a pre-patch for the generation of a read timing and a normal patch for density unevenness measurement. The test patch generation unit 35 starts forming (exposing) a pre-patch at timing t4 (an FG count of 10 before exposure of a normal patch in this embodiment) before the counter reaches a predetermined FG count value corresponding to the time to start expose a normal patch. A pre-patch is used to synchronize with the detection start timing of a test patch by the density sensor 51. The pre-patch may be short in the sub scanning direction. For example, this patch need not have a length corresponding to a one-rotation period of the motor, and is only required to have a length long enough to be detected by the density sensor 51. In the case shown in 9a in FIG. 9, the exposure time for a pre-patch is set to the FG counter of 2, and exposure for the pre-patch is stopped at timing t5.

At timing t6, the test patch generation unit 35 starts performing exposure for a normal patch when the predetermined FG count becomes 0 (S809). Thereafter, the test patch generation unit 35 continues exposure until the FG count becomes at least a value corresponding to one or more rotations of the motor (S810). The test patch generation unit 35 finally forms a test patch as a toner image on the intermediate transfer member 27 through the electrophotographic process described with reference to FIG. 1.

In FIG. 9, 9b shows a timing chart for reading a test patch, with reference to which the details of the processing in step S811 in FIG. 7 will be described. According to the description made with reference to 9a in FIG. 9, the test patch generation unit 35 starts performing exposure for a test patch after the FG count of 10 from the start of exposure for a pre-patch. For this reason, the density sensor 51 reads the test patch after the lapse of a time corresponding to the count of 9 since reading the pre-patch. At t8, the density sensor 51 detects the pre-patch. The CPU 401 then starts reading the test patch at t10 when a time corresponding to the count of 9 has elapsed since timing t9 of the detection of the next FG pulse. Referring to 9b in FIG. 9, reference numeral 1001 denotes an FG signal as a phase signal from the motor 6 which is obtained by exposing the normal test patch to read optical characteristics under the control of the CPU 401 and is recognized by the CPU 401. FIG. 10 schematically shows how this signal is obtained.

In FIG. 10, 10a to 10c schematically show the relationship between the exposure timing of the scanner unit 24 and the phase signal from the motor 6 which is recognized by the CPU 401 at the same timing. In FIGS. 10, 10a and 10b show how the CPU 401 recognizes the phase signal from the motor 6 when forming an electrostatic latent image on a test patch. Referring to FIG. 10, FGs1 and FGs2 respectively correspond to phases θ1 and θ2. In FIG. 10, 10c is a view showing which phase signals from the motor 6 at the time of image exposure correspond to the respective positions along the moving direction of the formed test patch. The CPU 401 also manages the correspondence relationship shown in 10c.

Although not shown in 9b in FIG. 9, in practice, the BPF also outputs a signal obtained by detecting the optical characteristics of a W4 component in synchronism with timing t10, and inputs it to the CPU 401. The density signal processing unit 405 then inputs the optical characteristics of the test patch obtained by the density sensor 51 to the CPU 401 through the LPF 407 and the BPF 408. The CPU 401 stores the optical characteristic value (corresponding to a density value) output from the density signal processing unit 405 and the phase signal (FG count value) from the motor 6 at the time of the formation of a patch to be detected in the EEPROM in association with each other. Upon reaching timing t11 and obtaining a detection result by the density sensor 51 which corresponds to an FG count corresponding to at least one rotation of the motor, the CPU 401 terminates the test patch reading operation.

<Density Unevenness Component of Test Patch>

As is understood from FIG. 10, the detection result on the test patch includes the influence of the rotation unevenness of the motor 6 at the time of exposure and the influence of the rotation unevenness of the motor 6 at the time of transfer. In this case, the source of rotation unevenness at the time of exposure is the same as that at the time of transfer. As described above, rotation unevenness reflecting the integrated influence is detected from a test patch. Note that since density unevenness is due to the physical shape of the motor, the rotation unevenness phase of a one-rotation period of the motor is reproducible in correspondence with the physical shape of the motor.

<Example of Output Correction Table>

Figure 11A:

FIGS. 11A to 11C show examples of correction tables created in accordance with the processing in step S812 in the flowchart of FIG. 7. The information shown in FIGS. 11A to 11C is stored in the EEPROM. At the time of image formation, the CPU 401 refers to this information to perform banding correction in accordance with the rotation unevenness phase of the motor.

Tables A in FIGS. 11A and 11B each show the correspondence between motor phases and the density values of a toner image. Referring to FIGS. 11A and 11B, tables A are respectively created for W1 and W4. In this case, for W1, it is possible to calculate the density values indicated by FIG. 11A by converting the voltage values V1 detected via the LPF 407 into density values. For W4, it is possible to calculate the density values indicated by FIG. 11B by converting the detection results obtained via the BPF 408 into density values and adding average density values to them. Note that it is possible to obtain average density values from the detection results for W1 or by making the correction information generation unit 36 average raw sensor output data indicated by 4b in FIG. 4.

The correction information generation unit 36 then calculate differences Δd1 and Δd2 between the respective density values and the respective average values for each of W1 and W4, and creates tables B by associating the calculated differences Δd1 and Δd2 and the respective phase signals. In this case, the average value is 10.000. The correction information generation unit 36 then adds the respective phase signals stored in table B and the corresponding differences Δd1 and Δd2 to summate the difference values for W1 and W4. Table C indicated by FIG. 11C is the resultant table.

The correction information generation unit 36 calculates a position correction value for each main scanning line of an image based on the total difference value corresponding to each phase signal. More specifically, first of all, letting $Dc\_n$ be a density variation ratio corresponding to FGn at a given phase of the motor 6, and Dave is an average density value, $Dc\_n$ is given as $Dc\_n = \text{total difference value}/Dave \times 100$ (table D). The correction information generation unit 36 then converts the correction value $Dc\_n$ into a position correction amount $Tc\_n$ according to $Tc\_n = K \times Dc\_n$ (table E), where K is a predetermined coefficient which determines the correspondence between a density variation ratio [%] and a position correction value [line] for each image resolution in the sub scanning direction. In the case shown in FIGS. 11A to 11C, K=1.5. In addition, the unit of position correction amount is dot, which represents how much a pixel signal is shifted relative to an adjacent line in the sub scanning direction. If the density variation ratios Dcn and the position correction values $Tc\_n$ do not have a proportional relationship, it is possible to hold the relationship between the density variation ratios Dcn and the position correction values $Tc\_n$ in the form of a table and to convert $Dc\_n$ into $Tc\_n$ by using the table.

The correction information generation unit 36 then interpolates the position correction value $Tc\_n$ between FG signals to create a position correction value $T\_m$ for each main scanning line. More specifically, letting ΔT [sec] be the scanning interval between the respective main scanning lines of image data, Mt [sec] be the time taken for one rotation of the motor, and n be an FG count corresponding to one rotation of the motor, the interval between FG signals, that is, the interval between the output timings of FG signals (phase signals) is given by ΔFt=Mt/n. Therefore, the correction information generation unit 36 interpolates data between the scanning intervals ΔFt by a method like a linear or spline interpolation method to generate data at the intervals ΔT (FIG. 12), thereby creating table F. For the sake of simplicity, FIG. 12 shows a case in which ΔFt=ΔT×3. As shown in FIG. 12, as the FG signal advances by one period, FG count=0 is set again to repeat the processing by the number of lines of one page of an image. With the above operation, it is possible to obtain a position correction value for each line in the sub scanning direction.

The CPU 401 stores the calculated information of table F in the EEPROM so as to allow the reuse of the information. As described above, this embodiment can cope with a case in which rotation unevennesses of a plurality of periods (frequencies) occur from one rotation member, that is, the motor 6, and affect banding, thereby finely handling the situation.

Figure 13:
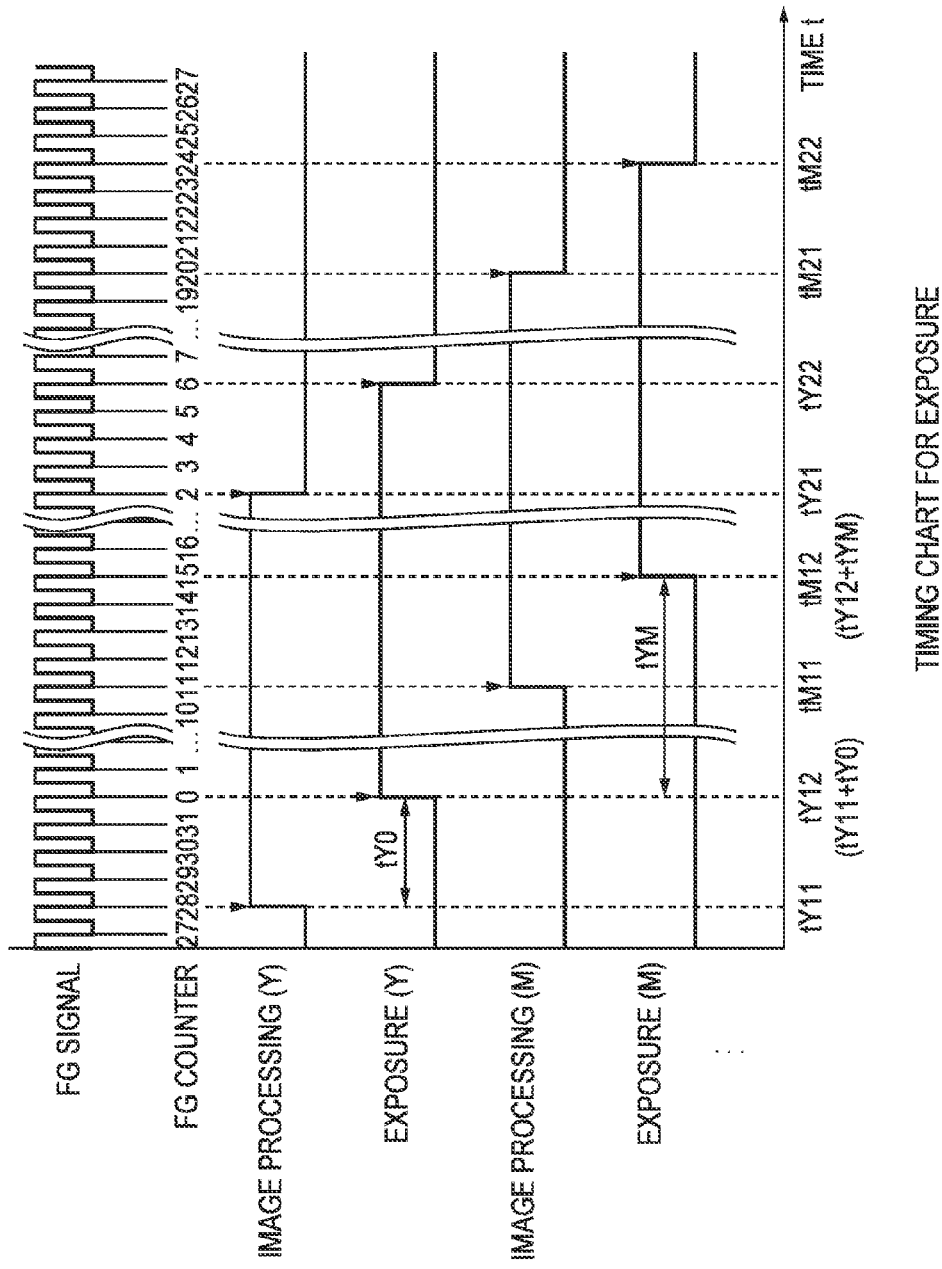
FIG. 13 is a timing chart showing the relationship between FG counter value and exposure timing at the time of image formation.

The relationship between FG counter value and exposure timing at the time of image formation will be described next with reference to FIG. 13. For the sake of simplicity, assume that the same motor drives the photosensitive drums 22Y, 22M, 22C, and 22K of the respective colors, namely Y, M, C, and K. The apparatus starts image data correction processing (to be described later) for a Y image of the first color at time tY11, and starts exposure for the Y image at the timing (time tY12) when the FG counter value becomes 0. At time tM11, the apparatus starts image data correction processing (to be described later) for an M image of the second color, and starts exposure for the M image at time tY21 when tYM has elapsed after the exposure for the Y image. In this case, tYM represents the time difference that is adjusted in advance to eliminate the difference in placement position between the photosensitive drums 22Y and 22M so as to match the position of the Y image with that of the M image in the conveying direction. An FG counter value FGm at time tM12 may be calculated according to tYM/ΔFt in advance before image formation, and a correction table for M may be created in advance with reference to FGm. The same applies to C and M. Obviously, when different motors drive the photosensitive drums 22Y, 22M, 22C, and 22K of Y, M, C, and K, it is possible to perform processing similar to that described above by acquiring the FG count value of the motor of each color by a method similar to that described above. Note that the correction processing of image data will be described in detail later.

<Image Data Correction>

Figure 14:
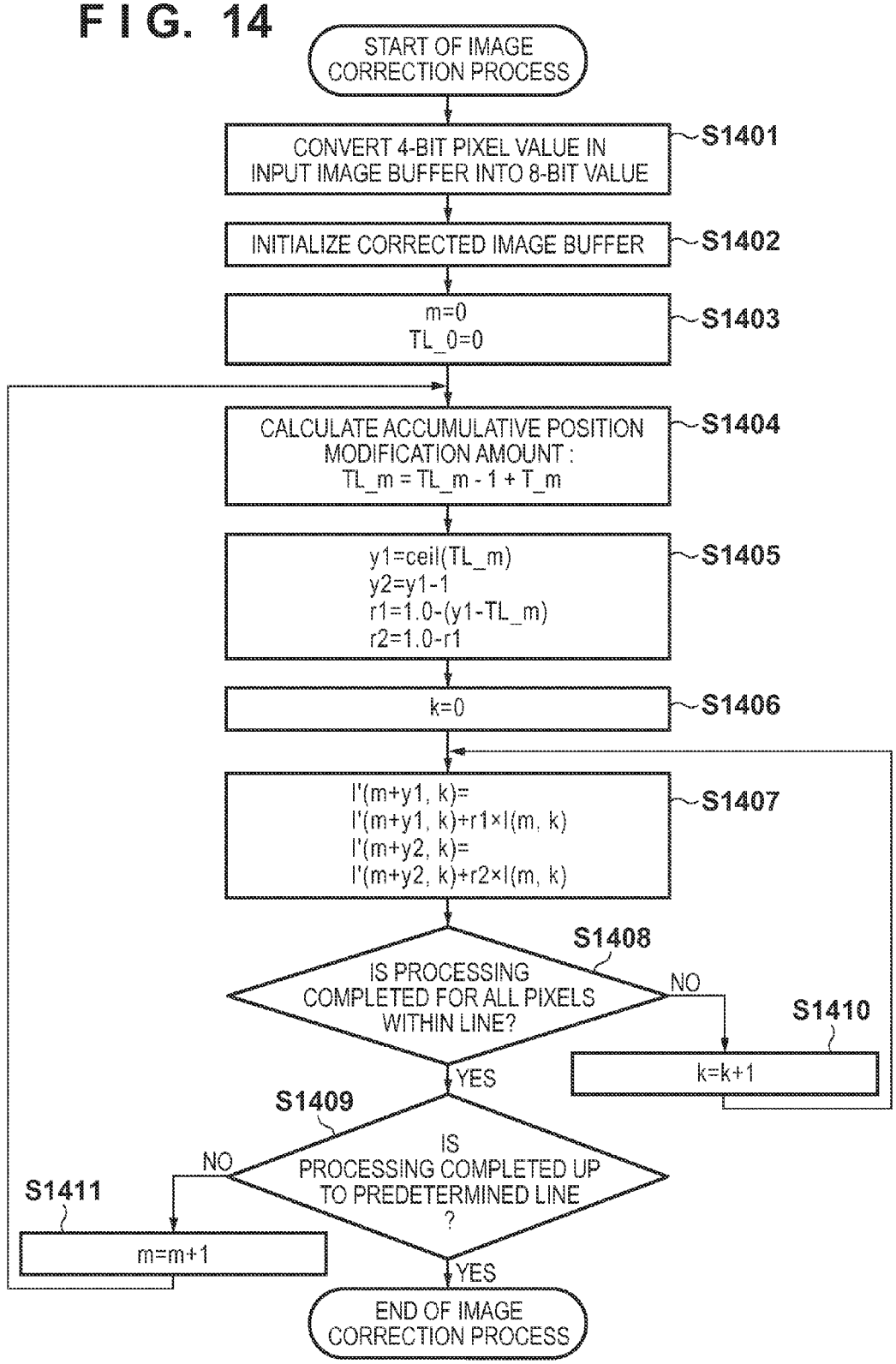
FIG. 14 is a flowchart showing an image correction process in the first and second embodiments.
Figure 15:
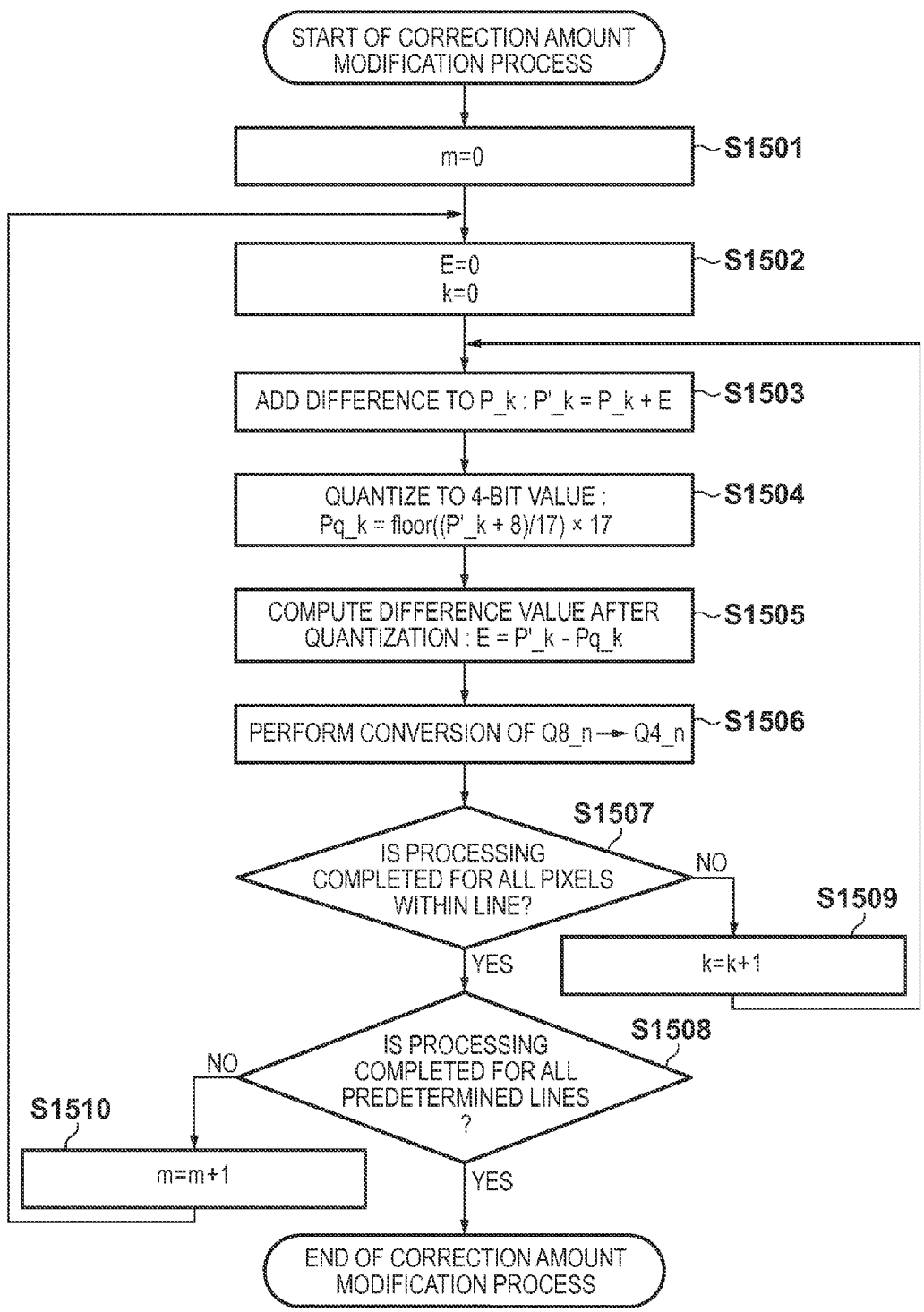
FIG. 15 is a flowchart showing a correction amount modification process in the first embodiment.

An image correction process and a correction amount modification process in the image correction unit 705 will be described next with reference to FIGS. 14 and 15. The image correction process will be described first with reference to FIG. 14. The image signal processed by the halftone processing unit 704 is temporarily loaded in the line buffer (input image buffer) in the storage unit 402. Assume that in this embodiment, the input image buffer has a size corresponding to one page. At the same time, assume that a corrected image buffer and an output image buffer each having the same size as that of the input image buffer are ensured in the storage unit 402. The input image buffer stores 4-bit pixel values like those indicated by (a) in FIG. 17 which have undergone halftone processing.

First of all, in step S1401, the image correction unit 705 converts 4-bit pixel values Q4_$n$=0 to 15 stored in the input image buffer into 8-bit values Q8_$n$=0 to 255, as shown in (b) in FIG. 17. In step S1402, the image correction unit 705 then performs initialization to clear the corrected image buffer to 0.

In step S1403, the image correction unit 705 sets line number m=0 and accumulative position correction amount TL_0=0 for a first main scanning line L_0. In addition, since the apparatus starts exposure for image data at the timing when an FG count value FGs becomes 0, the image correction unit 705 sets the position correction value T_m for a line L_m.

The image correction unit 705 then performs corrections for the main scanning line L_m. A method of correcting the main scanning line L_m will be described below. First of all, in step S1404, the image correction unit 705 reads the position correction value T_m for the mth line from the position correction table (FIGS. 11A to 11C), and calculates an accumulative position correction amount TL_m for the main scanning line L_m from an accumulative position correction amount TL (m−1) for the (m−1)th line and the position correction value T_m by the following processing: TL_m=TL_(m−1)+T_m. Subsequently, the image correction unit 705 corrects the input image signal. The image correction unit 705 performs this correction to shift the image signal corresponding to the line L_m by TL_m lines.

First of all, in step S1405, the image correction unit 705 obtains a correction amount by the following equations:

$$y1 = \text{ceil}(TL\_m)$$

$$y2 = y1 - 1$$

$$r1 = 1.0 - (y1 - TL\_m)$$

$$r2 = 1.0 - r1$$

where ceil represents rounding to an integer in a positive infinite direction.

In step S1406, the image correction unit 705 initializes a pixel number k in the main scanning direction to 0. In step S1407, the image correction unit 705 corrects the image signal according to the following equations:

$$I'(m+y1,k) = I'(m+y1,k) + r1 \times I(m,k)$$

$$I'(m+y2,k) = I'(m+y1,k) + r2 \times I(m,k)$$

where I(m, k) represents the value of a pixel, in the input image buffer, which is located at the mth sub scanning line and the kth main scanning line, and I'(m, k) represents the value of a pixel, in the corrected image buffer, which is located at the mth sub scanning line and the kth main scanning line.

The contents of the processing based on the above equations will be described with reference to 18a and 18b in FIG. 18. As shown in FIG. 18, when position correction amount TL_m=1.3 [line] for the main line L_m, the image correction unit 705 shifts the line L_m by 1.3 lines in the sub scanning direction. In this case, line-based shift amount=1 line and shift amount of less than 1 line=0.3 lines. The image correction unit 705 performs correction of a shift amount of less than 1 line by distributing pixel values to two lines. For example, in the case of TL_m=1.3 [line], y1=2, y2=1, r1=0.3, and r2=0.7. With regard to the two lines, m+y1 indicates the line on the downstream side in the sub scanning direction, and m+y2 indicates the line on the upstream side in the sub scanning direction. In addition, r1 indicates a weight assigned to the (m+y1)th line, and r2 indicates a weight assigned to the (m+y2)th line.

Consider an input pixel value I(y, k) on the line L_m in 18a in FIG. 18. In this case, the image correction unit 705 adds the value obtained by multiplying the value of an image signal I(m, k) on the mth line in the input image buffer by r1=0.3 to a pixel value I' (m+2, k) on the (m+y1)th=(m+2)th line in the corrected image buffer. In addition, the image correction unit 705 adds the value obtained by multiplying the value of the image signal I(m, k) on the mth line in the input image buffer by r2=0.7 to a pixel value I' (m+1, k) on the (m+y2)th=(m+1)th line on the output image buffer. With this operation, pixel values like those shown in 18*b* in FIG. 18 are added to lines L_(m+1) and L_(m+2) in the corrected image buffer.

In step S1408, the image correction unit 705 determines whether the processing is completed for all the pixels within the line. If NO in step S1408, the image correction unit 705 increments k by one in step S1410. The flow then shifts to step S1407 again. If the image correction unit 705 determines in step S1408 that the processing is completed for all the pixels, the process advances to step S1409. With the above processing, the image correction unit 705 performs position correction with respect to the line L_m.

In step S1409, the CPU 401 determines whether the processing is completed for a predetermined main scanning line (the last main scanning line within the page). If NO in step S1409, the image correction unit 705 increments m by one in step S1411 to execute the processing in step S4104 for the next main scanning line. Upon completing for a predetermined number of main scanning lines and determining YES in step S1409, the CPU 401 terminates the image correction process. The process then shifts to the next correction amount modification process. Note that in the image correction process, an output image signal corresponds to the first correction image signal.

The correction amount modification process will be described next with reference to FIG. 15. In the correction amount modification process, the image correction unit 705 converts 8-bit data in the corrected image buffer into 4-bit data, and stores the data in the output image buffer. The image correction unit 705 sets the pixel values on the line L_m in the corrected image buffer to P_0, P_1, ... from the left end in the scanning direction, and sets the kth pixel value to P_k. First of all, in step S1501, the image correction unit 705 sets m=0. In S1502, the image correction unit 705 initializes a difference E to 0, and sets main scanning number of pixel of interest k=0. Thereafter, the image correction unit 705 performs modification for the main scanning line L_m. First of all, the image correction unit 705 adds the difference E to P_k (P'_k=P_k+E) to obtain P'_k in step S1503.

In step S1504, the image correction unit 705 performs quantization to 4-bit values. In this case, as for each 4-bit value, the image correction unit 705 expresses a 4-bit value Q8_*n* nearest to P'_k as a quantized signal Pq_k by using a value Q8_*n* in an 8-bit expression described above. The image correction unit 705 can perform quantization according to the following equation:

$$Pq\_k = \text{floor}((P'\_k+8)/17) \times 17$$

where floor represents rounding to an integer in a negative infinite direction.

In step S1505, the image correction unit 705 functions as a difference calculation unit and calculates the difference (quantization error) between values before and after the quantization, as E, by $$E = P'\_k - Pq\_k$$

In step S1506, the image correction unit 705 converts data in the 8-bit expression into data in the 4-bit expression (conversion from Q8_*n* to Q4_*n*), and stores, in the output image buffer, a value Q_k after the conversion as an output image signal representing the pixel of interest, thereby completing the processing for the pixel of interest.

In step S1507, the image correction unit 705 determines whether the processing is completed for all the pixels within the line. If NO in step S1507, the image correction unit 705 increments k by one in step S1509. The process then shifts to step S1503 again. Upon determining in step S1507 that the processing is completed for all the pixels, the image correction unit 705 determines next in step S1508 whether the processing is completed for a predetermined main scanning line (the last main scanning line within the page). If NO in step S1508 the image correction unit 705 increments m by one in step S1510. The process then shifts to the processing in step S1502. If the processing is completed for a predetermined number of main scanning lines and the CPU 401 determines YES in step S1508, the correction amount modification processing is completed for one page. Note that the image signal output in the correction amount modification process corresponds to the second corrected image signal.

The manner of performing a series of processing operations in steps S1503 to S1506 will be described with reference to 18*c* in FIG. 18. Referring to 18*c* in FIG. 18, reference numeral 1801 denotes values on the line L_m in the corrected image buffer. The first pixel of interest is P_0=48, and E is 0 because it is initialized. With the processing in step S1503, therefore, P'_k=48. In step S1504, the image correction unit 705 performs quantization to obtain Pq_k=(floor(48+8)/17)×17=51. In step S1505, difference E=48−51=−3. In step S1506, the image correction unit 705 performs conversion of 51→3 (conversion from data in the 8-bit expression to data in the 4-bit expression; conversion from 51 to 3 in FIG. 17). As a result, output value Q_0=3.

The process then shifts the processing for P_1. Since P_1=179, P'_1=P_1+E=179−3=176 in step S1503. In step S1504, Pq_k=(floor(176+8)/17)×17=170. In step S1505, difference E=176−170=6. In step S1506, the image correction unit 705 performs conversion of 170→10 to obtain output value Q_1=10. The image correction unit 705 sequentially performs processing while shifting the pixel of interest in the scanning direction in the above manner. This diffuses the quantization error between the quantized signal Pq_k of each pixel on the main scanning line and the value P_k before quantization within the main scanning line, thereby greatly reducing the sum total of quantization errors within the main scanning line.

<Synchronization Between Image Data and FG Pulse>

Figure 16:
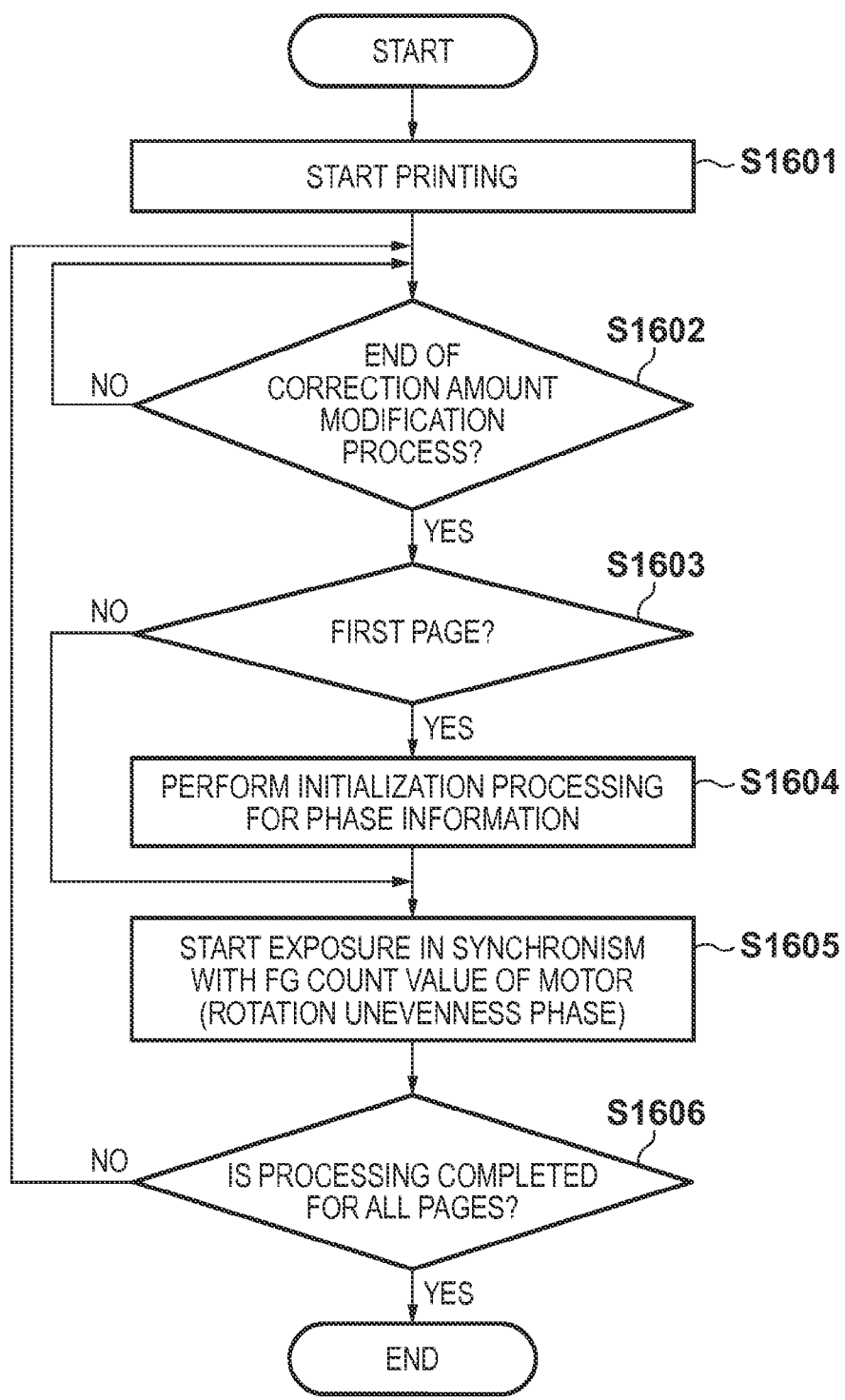
FIG. 16 is a flowchart showing synchronization between image data and FG pulses.

Synchronization between image data and an FG pulse will be described next with reference to FIG. 16. The CPU 401 starts the processing in the flowchart of FIG. 16 in association with the correction amount modification process in FIG. 15.

First of all, when starting printing operation in step S1601, the CPU 401 determines in step S1602 whether the correction amount modification process is complete. If NO in step S1602, the CPU 401 waits until the completion of the process. Upon completion of the correction amount modification process and determining YES in step S1602, the CPU 401 determines in step S1603 whether the current processing is for the first page in the print job. Upon determining that the processing is for the first page, the CPU 401 executes reset processing for the motor FG counter value (initialization processing for a phase signal) described with reference to FIG. 8 in step S1604. This reset processing makes it possible to reproduce the association of the speed variation state of the motor 6 with a phase of the motor 6 at a predetermined timing determined by the timing chart of FIG. 8. Thereafter, the CPU 401 specifies (monitors) the phase change of the motor by using the FG count value as a parameter. This makes it possible to cause the scanner unit 24 to perform exposure for the cancellation of the rotation unevenness of the motor 6 in synchronism with the specified phase change of the rotation unevenness phase of the motor 6 in the next step.

In step S1605, the CPU 401 specifies the phase change of the rotation unevenness of the motor 6. When the phase of the rotation unevenness of the motor 6 becomes an FG count value of 0, the CPU 401 causes the scanner unit 24 to start exposure in synchronism with this operation, thereby performing image formation. In step S1605, the scanner unit 24 performs exposure upon image correction in accordance with the phase of the rotation unevenness of the motor. In this case, establishing synchronization between an FG count value of 0 and the start timing of exposure in the above manner will match a correction phase with a banding phase in the image correction process and the correction amount modification process. It is therefore possible to effectively reduce banding. Subsequently, the CPU 401 determines in step S1606 whether the processing is completed for all the pages. If YES in step S1606, the CPU 401 terminates the processing.

As described above, according to the above embodiment, it is possible to reduce density unevenness due to the rotation unevenness of the motor. In addition, when considering the rotation unevenness of the motor 6, similar banding does not always occur at the same position on a printing medium P. However, the above embodiment can cope with such a case and properly perform correction of density unevenness (banding). For the sake of descriptive convenience, the embodiment is configured to have a page memory corresponding to one page. However, to save the memory, the embodiment may be configured to have only a line buffer corresponding to the number of lines required. In addition, to prevent quantized signals having the same value from continuing in the sub scanning direction, it is possible to interchange pixel numbers from which a correction amount modification process starts for each line. As described above, a belt driving roller, photosensitive drums, development roller, and the like can be assumed as banding sources as long as they are rotation members associated with image formation. The correction described above is not limited to banding correction, and can be applied to correction other than banding correction.

The relationship between a correcting direction and a direction to diffuse quantization errors and the effects will be described.

Diffusing quantization errors in the same direction as the correcting direction (the sub scanning direction in this embodiment) will generate many pixels containing the same quantization error at each main scanning position within the same main scanning line. As a result, average positions corrected in the sub scanning direction on the overall scanning lines include many errors, resulting in noticeable streaks due to the errors. This degrades the image quality. Furthermore, if the banding period is short, since a correction amount changes at a high frequency for each scanning line, the diffusion of errors cannot follow up changes in correction amount, resulting in a great reduction in banding reducing effect.

In contrast to this, as disclosed in this embodiment, diffusing quantization errors in the main scanning direction on each scanning line will make average corrected positions in the sub scanning direction on the overall scanning lines almost match the accuracy of 8 bits. In addition, even when the banding period is short, since there is no exchange of quantization errors between the respective scanning lines, it is possible to perform accurate correction. That is, it is possible to effectively perform correction by diffusing quantization errors in a direction (the main scanning direction in this embodiment) perpendicular to the correcting direction (the sub scanning direction in the embodiment), as in the present invention.

Second Embodiment

The first embodiment described above performs modification in the correction amount modification process by adding the difference of a pixel of interest to an adjacent pixel. The second embodiment will exemplify another correction amount modification method. More specifically, this embodiment modifies a correction amount so as to minimize a quantization error for each block including a plurality of continuous pixels on the same main scanning line. Since the procedure up to the density correction in FIG. 14 is the same as that in the first embodiment, a description of the procedure will be omitted. Arrangements and techniques different from those in the above embodiment will be described below.

Figure 19A:
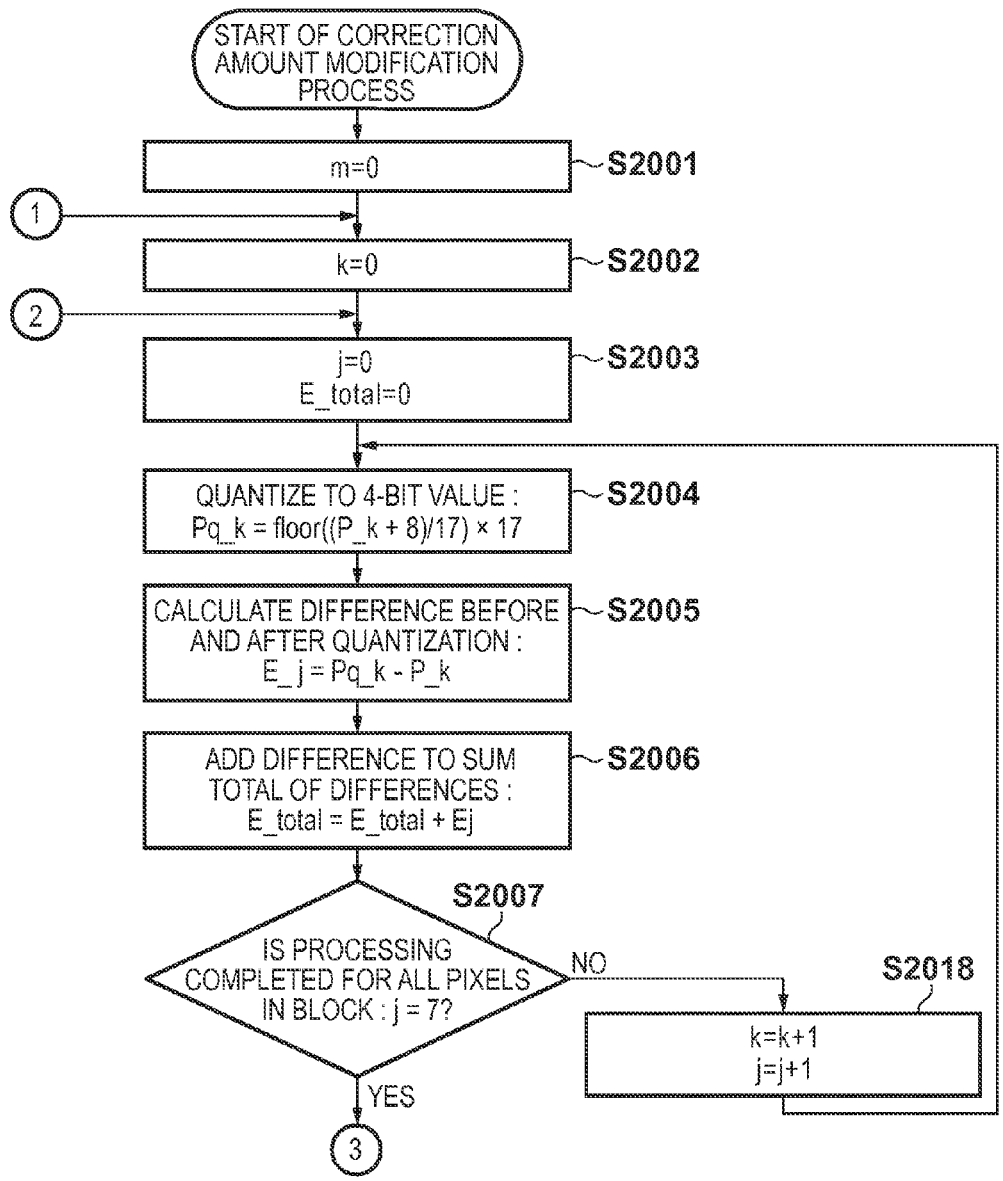
FIGS. 19A and 19B are flowcharts showing another correction amount modification process.
Figure 19B:
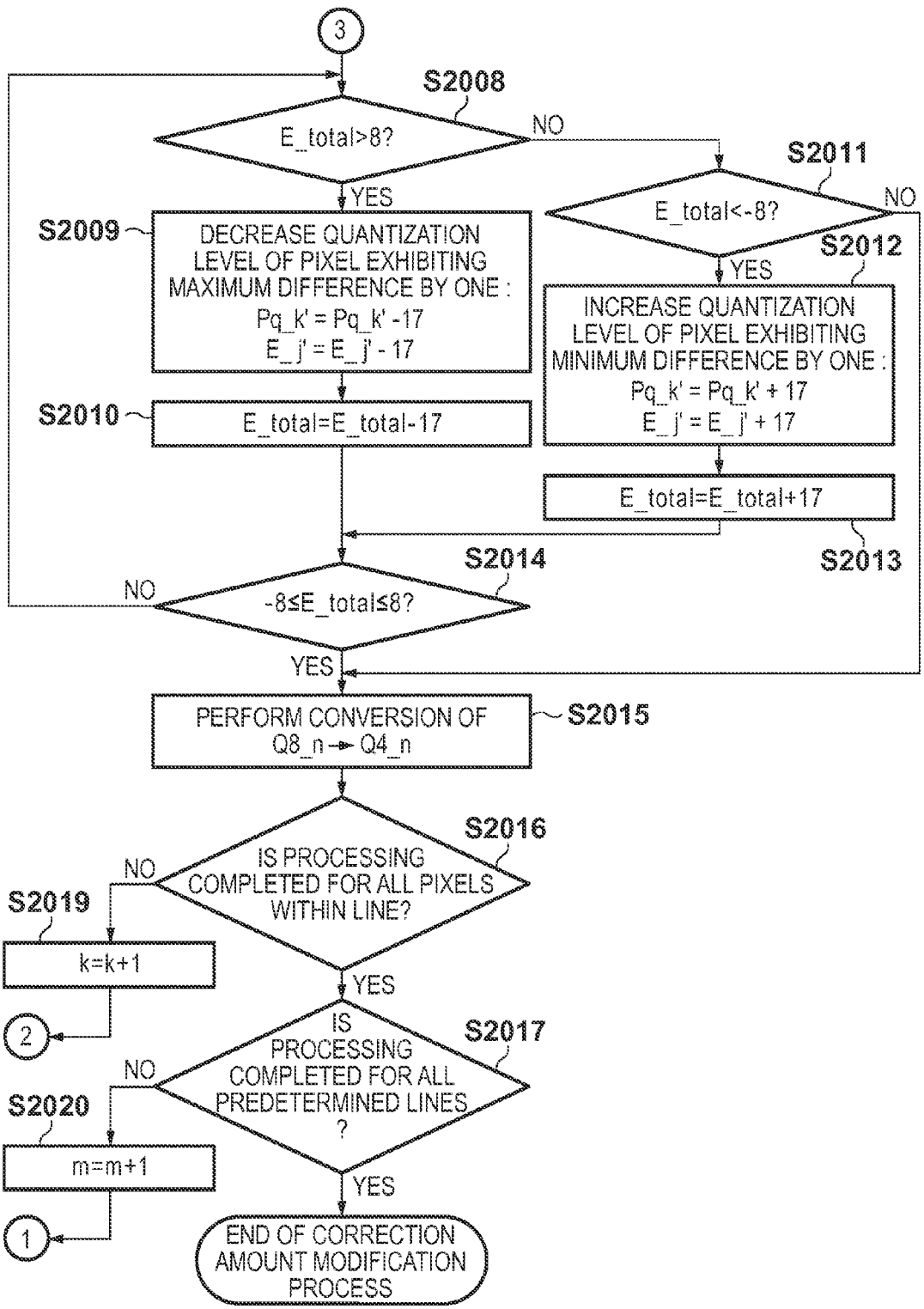

A correction amount modification process in this embodiment will be described first with reference to FIGS. 19A and 19B. When starting the correcting amount modification process, an image correction unit 705 initializes a line number m to 0 in step S2001. In step S2002, the image correction unit 705 initializes main scanning number k to 0. In step S2003, the image correction unit 705 initializes an intra-block pixel number j to 0, and also initializes a sum total E_total of differences within the block to 0.

Block-based processing then starts. In step S2004, the image correction unit 705 quantizes a corrected image signal P_k to a 4-bit value to obtain Pq_k. The image correction unit 705 uses the same quantization method as that in the first embodiment. That is, the image correction unit 705 quantizes a 4-bit value Q8_$n$ nearest to P_k to Pq_k by using a value Q8_$n$ in the 8-bit expression as in step S1504. The image correction unit 705 then functions as a difference calculation unit and a sum total calculation unit to calculate differences E_j between values before and after quantization according to E_j=Pq_k−P_k in step S2005, and updates the sum total E_total of the differences in the block according to E_total=E_total+E_j in step S2006. In this embodiment, the block size has 8 pixels. In step S2007, the image correction unit 705 determines whether j=7, that is, the processing is completed for all the pixels in the block. If NO in step S2007, the image correction unit 705 increments k and j by one each to return the process to step S2004. If YES in step S2007, the process shifts to a correction process after step S2008.

In step S2008, the image correction unit 705 determines whether the sum total E_total of the differences is larger than 8. If YES in step S2008, the process advances to step S2009 to select a pixel j' exhibiting the maximum difference among differences E_0 to E_7 in the block, and decreases a quantized value Pq_k' of a corresponding pixel number k' to the immediately lower quantization level (that is, Q8_$n$→Q8_$(n-1)$). At the same time, the image correction unit 705 sets E_j'=E_j'−17. In this embodiment, since the step amount of the quantized value Q8_$n$ is 17, Pq_k'=Pq_k'−17. In step S2010, the image correction unit 705 then sets the sum total E_total of the differences to E_total=E_total−17. The process then shifts to step S2014.

If NO in step S2008, the process advances to step S2011, in which the image correction unit 705 determines whether the sum total E_total is smaller than −8. If YES in step S2011, the process advances to step S2012, in which the image correction unit 705 selects the pixel j' exhibiting the minimum difference among the differences E_0 to E_7 in the block, and increases the quantized value Pq_k' of the corresponding pixel number k' to the immediately higher quantization level (that is, Q8_$n$→Q8_$n$+1). At the same time, the image correction unit 705 sets E_j'=E_j'+17. In this embodiment, since the step amount of the quantized value Q8_$n$ is 17, Pq_k'=Pq_k'+17.

In step S2013, the image correction unit 705 also sets the sum total E_total of the differences to E_total=E_total+17. The process then shifts to step S2014. In step S2104, the image correction unit 705 determines whether the value of E_total falls within (+/−) quantization step amount/2. That is, the image correction unit 705 determines whether −8≤E_total≤8. If NO in step S2014, the image correction unit 705 performs the processing in step S2008 again. If there are a plurality of pixels exhibiting the maximum or minimum difference in steps S2009 and S2012, the image correction unit 705 may select one of the pixels which has the minimum value of j.

If YES in step S2014, the image correction unit 705 determines that the absolute value of the sum total of the differences converges to an allowable range, and terminates the modifying operation. The process then advances to step S2015. If NO in step S2011, since −8≤E_total≤8, the process directly advances to step S2015. In step S2015, the image correction unit 705 performs conversion of Q8_$n$→Q4_$n$ as in step S1506 in the first embodiment, and stores the value Q_k after conversion as an output value in the output image buffer. The image correction unit 705 then completes the processing in the block. Subsequently, the image correction unit 705 determines in step S2016 whether the processing is completed for all the pixels within the line. If NO in step S2106, the image correction unit 705 increments the pixel number k by one in step S2019. The process advances to step S2003 again to process the next block. If the image correction unit 705 determines in step S2016 that the processing is completed for all the pixels, the image correction unit 705 determines in step S2017 whether the processing is completed for a predetermined main scanning line (the last main scanning line in the page). If NO in step S2017 the image correction unit 705 increments m by one in step S2020. The process then shifts to step S2002 again. Upon completing the processing for a predetermined number of main scanning lines and determining YES in step S2020, the CPU 401 terminates the correction amount modification process for one page.

The manner of performing a series of processing operations in step S2004 to S2015 described above will be described with reference to FIG. 20. Assume that as in the first embodiment, the corrected image buffer has stored values like those indicated by reference numeral 2101 on the line L_m as a result of an image correction process. First of all, in step S2004, the image correction unit 705 quantizes the corrected image signal P_0=48 to obtain Pq_0=51. In step S2005, difference E_0=3, and the sum total E_total of the differences is initialized to 0. In step S2006, therefore, E_total=3. The image correction unit 705 sequentially performs the above processing for P_1 to P_7 in the block to calculate the quantized signals Pq_0 to Pq 7 indicated by reference numeral 2102 and the differences E_1 to E_7 indicated by reference numeral 2103, thereby calculating sum total E_total of differences=28 (2108). When the processing for Pq 7 is complete, since j=7, YES is obtained in step S2007. The process therefore shifts to the next processing in step S2008.

In step S2008, since E_total=28>8, YES is obtained. The process advances to step S2009 to select a pixel exhibiting the maximum difference among E_0 to E_7. In the case shown in FIG. 20, the maximum difference value among the differences (2103) is 8. Since there are four pixels E_1, E_2, E_5, and E_6 exhibiting the difference of 8. For this reason, the image correction unit 705 selects E_1 with the minimum pixel number and decreases the quantization level of Pq_1 corresponding to E_1 by one. That is, the image correction unit 705 converts the value of Pq_1 from 187→170. In addition, the image correction unit 705 subtracts 17 from the value of E_1 to obtain E_1=−9. Reference numeral 2104 in FIG. 20 denotes pixel values after quantization level change; and 2105, differences. The value of a pixel Pq_1 indicated by the hatching as indicated by reference numeral 2104 is a changed pixel. In step S2010, the image correction unit 705 subtracts 17 from sum total E_total of differences=28 to obtain E_total=11 (2109).

In step S2014, the image correction unit 705 determines whether −8≤E_total≤8. Since E_total=11>8, NO is obtained in step S2014. The process shifts to step S2008. In step S2008, YES is obtained. In step S2009, the image correction unit 705 selects a pixel exhibiting the maximum difference among the differences denoted by reference numeral 2105. Since the maximum difference value among the differences (2105) is 8 and there are three pixels E_2, E_5, and E_6 exhibiting the difference of 8, the image correction unit 705 selects E_2 with the minimum pixel number, and decreases the quantization level of Pq 2 corresponding to E_2 by one. That is, the image correction unit 705 converts the value of Pq 2 from 187 to 170. In addition, the image correction unit 705 subtracts 17 from the value of E_2 to obtain E_2=−9. Reference numeral 2106 in FIG. 20 denotes pixel values after quantization level change; and 2107, differences. The value of a pixel Pq 2 indicated by the hatching as indicated by reference numeral 2106 is a changed pixel. In step S2010, the image correction unit 705 subtracts 17 from sum total E_total of differences=11 to obtain E_total=−6 (2110). In step S2014, the image correction unit 705 determines whether −8≤E_total≤8, and determines "YES". The image correction unit 705 then terminates the modification process in the block. The process shifts to step S2015. In step S2015, the image correction unit 705 performs conversion of Q8_$n$→Q4_$n$ as in step S1506 in the first embodiment, and stores the value Q_k after conversion as an output value in the output image buffer. The image correction unit 705 then completes the processing in the block. Subsequently, the process shifts to the processing for the next 8 pixels, and the image correction unit 705 sequentially processes blocks each including 8 pixels.

As described above, in this embodiment, in quantization processing, if the sum total of differences is positive, the image correction unit 705 changes the quantization level of the value of a pixel, of the differences in a block, which is a positive value and exhibits the maximum difference in absolute value to the immediately lower level. If the sum total of the differences is negative, the image correction unit 705 changes the quantization level of the value of a pixel, of the differences in a block, which is a negative value and exhibits the maximum difference in absolute value to the immediately higher level. In addition, the image correction unit 705 repeatedly executes this quantization processing until the absolute value of the sum total of differences becomes smaller than a predetermined value (eight in this case).

As described above, minimizing quantized errors on a block basis can effectively execute the present invention. Note that in this embodiment, the block length has 8 pixels. However, the number of pixels of a block is not limited to this. In addition, it is possible to effectively execute the present invention by multiplying the block length and the period of halftone processing by integers so as to prevent the period of correction amount modification processing from interfering with the period of halftone processing.

Third Embodiment

The first and second embodiments are configured to reduce banding by correcting positions. The third embodiment will exemplify a case in which banding is reduced by correcting densities (obtaining density correction amounts). This embodiment is the same as the first embodiment in the basic arrangement for correcting an image in synchronism with FG pulses of the motor. For this reason, only correction tables and an image correction process in an image correction unit 705 will be described below.

Examples of correction tables in this embodiment will be described first with reference to FIG. 21. Since tables A to D are the same as those in the first embodiment and FIGS. 11A to 11C, a description of them will be omitted. This embodiment converts a correction value Dc_n in table D into a density correction value Dcc_n (table E) according to Dcc_n=K'×Dc_n. In this case, K' is a predetermined coefficient, which determines the correspondence between a density variation ratio [%] and a density correction value. In this case, the density correction value Dcc_n represents a correction amount for a 4-bit (0 to 15) image signal value. In the case shown in FIG. 21, K'=0.075. Note that when the density variation ratio Dc_n and the density correction value Dcc_n do not have a proportional relationship, it is possible to hold the relationship between density variation ratios Dc_n and the density correction values Dcc_n in the form of a table and to convert Dc_n into Dcc_n by using the table.

As in the case shown in FIG. 12 in the first embodiment, the image correction unit 705 interpolates the density correction value Dcc_n and generates the data of a density correction value D_m for each main scanning line, thereby obtaining table F. The image correction unit 705 further computes a density correction value Dq_m by multiplying D_m by 17 and rounding off the product to an integer, thereby generating table G. More specifically, the image correction unit 705 calculates the value of Dq_m according to Dq_m=floor (D_m×17+0.5). As a value in table G, the image correction unit 705 obtains the value of q, of p/17 (p=0, 1, ..., 17), which is nearest to table F. A CPU 401 stores the calculated information of table G in an EEPROM to allow the reuse of the information.

<Image Correction Process>

An image correction process in this embodiment will be described next with reference to FIG. 22. The image signal processed by a halftone processing unit 704 is temporarily loaded in a line buffer (input image buffer) in a RAM 402. Assume that as in the first embodiment, the input image buffer in the third embodiment has a size corresponding to one page.

The input image buffer stores 4-bit pixel values like those indicated by (a) in FIG. 17, which have undergone halftone processing. First of all, in step S2301, the image correction unit 705 sets line number m=0. In addition, in this embodiment as well, since exposure for image data starts at the timing when an FG count value FGs becomes 0, a density correction value for a line L_m is represented by D_m.

In step S2302, the image correction unit 705 initializes the pixel number k to 0 in the main scanning direction. In step S2303, the image correction unit 705 converts the density correction value Dq_m into a block-based correction amount (modified correction amount) by using the conversion table shown in FIG. 23. As described above, density correction value Dq_m=p represents a correction amount of p/17 for a 4-bit (0 to 15) input image signal.

If, for example, Dq_m is 1, the image correction unit 705 converts the data into a 17-pixel block like that denoted by reference numeral 2401. The block 2401 includes one pixel with a correction amount of 1 and 16 pixels with a correction amount of 0. Therefore, the average correction amount in the block is $1/17$. A correction amount of $1/17$ is expressed on a block basis. Likewise, when Dq_m=2, the block includes two pixels with a correction amount of 1 and 15 pixels with a correction amount of 0, and the average correction amount in the block is $2/17$. That is, a correction amount of $2/17$ is expressed on a block basis. The same applies to Dq_m=3 to 5. As is obvious from FIG. 23, pixels with a correction amount of 1 are arranged in each block so as not be decentered within the block and within the repetition period of blocks. The above conversion allows to perform correction on a $1/17$ basis. Assume that the correction amounts converted on a block basis are sequentially represented by D_b k_0 to D_b k_16. Although the above description has exemplified the case in which Dq_m is a positive value, the present invention also assumes that Dq_m is a negative value. When Dq_m is a negative value, one pixel in the above block is a pixel with a correction value of −1.

In step S2304, the image correction unit 705 initializes a pixel number j in a block to 0. In step S2305, the image correction unit 705 adds the correction value converted in step S2303 to the input image signal according to $$I(m,k)=I(m,k)+D\_bk\_j$$

According to the above equation, the image correction unit 705 sequentially adds a corresponding block-based correction amount D_b k_j to each pixel from the left end of a line m in the input image buffer.

In step S2306, the image correction unit 705 determines whether j=16. If NO in step S2306, the image correction unit 705 increments k and j by one in step S2309 to perform correction processing again in step S2307. If YES in step S2306, the image correction unit 705 completes the correction for the block. In step S2307, the image correction unit 705 determines whether the processing is completed for all the pixels within the line. If NO in step S2307, the image correction unit 705 increments k by one in step S2310, and initializes j to 0 in step S2304. In step S2305, the image correction unit 705 performs correction processing for the next block. Upon determining in step S2307 that the processing is completed for all the pixels within the line, the image correction unit 705 determines in step S2308 whether the processing is completed for a predetermined main scanning line (the last main scanning line in the page). If NO in step S2308 the image correction unit 705 increments m by one in step S2311 to perform the processing in step S2302 for the next line. Upon completing the processing for a predetermined number of main scanning lines and determining "YES" in step S2308, the CPU 401 terminates the image correction process for one page.

As has been described above, according to this embodiment, it is possible to perform correction with 4-bit values (0 to 15) on a $1/17$ basis, and hence to perform accurate correction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-282393, filed Dec. 17, 2010 and 2011-256415, filed Nov. 24, 2011, which are hereby incorporated by reference herein in their entirety.

What is claimed is:

1. An image forming apparatus comprising:
a correction amount determination unit which determines a correction amount for an image signal so as to correct banding as periodic density unevenness in a sub-scanning direction;
an image correction unit which corrects each pixel value of an n-bit image signal in accordance with the correction amount determined by said correction amount determination unit and outputs the image signal as a first corrected image signal; and
a quantization unit which quantizes, for each pixel, the first corrected image signal corrected by said image correction unit into a second corrected image signal of m bits smaller than n bits,
wherein said quantization unit diffuses, in a main scanning direction which is a direction perpendicular to a correcting direction of the banding, quantization errors at the time of quantization of the first corrected image signal into the second corrected image signal so as to cancel the quantization errors within a predetermined region including a plurality of continuous pixels on a main scanning line.

2. The apparatus according to claim 1, wherein said quantization unit comprises:
a difference calculation unit which calculates a difference between the second corrected image signal and the first corrected image signal of a pixel of interest; and
an addition unit which adds the difference calculated by said difference calculation unit to the first corrected image signal of a pixel adjacent to the pixel of interest in the main scanning direction.

3. The apparatus according to claim 1, wherein said quantization unit comprises:
a difference calculation unit which calculates a difference between the second corrected image signal and the first corrected image signal for each pixel on each main scanning line;
a sum total calculation unit which calculates a sum total of the differences calculated by said difference calculation unit for each predetermined block including a plurality of continuous pixels on a main scanning line; and
a modification unit which modifies the second corrected image signal in a block so as to reduce an absolute value of the sum total.

4. The apparatus according to claim 3, wherein said modification unit executes quantization processing such that when the sum total is positive, a second corrected image signal of a pixel having a difference, of differences in a block, which is a positive value and a maximum value in absolute value is changed to an immediately lower quantization level, and when the sum total is negative, a second corrected image signal of a pixel having a difference, of the differences in the block, which is a negative value and a maximum value in absolute value is changed to an immediately higher quantization level, and repeatedly executes the quantization processing so as to reduce the absolute value of the sum total to a value smaller than a predetermined value.

5. The apparatus according to claim 1, wherein said correction amount determination unit determines, as the correction amount, a position correction amount for shifting an image signal on each main scanning line to an adjacent line in a sub scanning direction.

6. The apparatus according to claim 5, further comprising:
an image forming unit which includes a rotation member and a motor for driving the rotation member and forms an image; and
a patch forming unit which forms a patch image for detecting density unevenness accompanying rotation unevenness of the motor by using said image forming unit,
wherein said correction amount determination unit comprises:
a unit which calculates a difference between an average density of density detection signals from a density sensor which detects a density of the patch image and a density detection signal obtained every time a phase signal associated with driving of the motor is output;
a unit which calculates a density variation ratio from the difference at each timing when the phase signal is output;
a unit which calculates a position correction amount in the sub scanning direction by multiplying the density variation ratio by a predetermined coefficient at each timing when the phase signal is output;
a unit which determines a position correction amount for each main scanning line by interpolating the position correction amount between the respective timings when the phase signals are output; and
a unit which creates a table defining each main scanning line and a determined position correction amount in association with each other and stores the table in a storage unit,
wherein, said image correction unit generates the first corrected image signal by using the table stored in said storage unit.

7. The apparatus according to claim 1, further comprising a halftone processing unit which performs halftone processing for an image signal and outputs the m-bit image signal, wherein said image correction unit converts each pixel value of an m-bit image signal into an n-bit image signal after halftone processing, and then corrects the image signal into the first corrected image signal.

8. An image forming apparatus comprising:
a correction amount determination unit which determines a correction amount for an image signal so as to correct banding as periodic density unevenness in a sub-scanning direction;
a quantization unit which quantizes the correction amount determined by said correction amount determination unit from n bits to m bits smaller than the n bits;
a conversion unit which converts the correction amount quantized by said quantization unit into a modified correction amount indicating a correction amount for each block including a plurality of continuous pixels in a main scanning direction; and
an image correction unit which corrects the image signal by adding a block-based modified correction amount converted by said conversion unit to a pixel of an m-bit image signal which corresponds to the block,
wherein said conversion unit performs conversion such that an average value of block-based modified correction amounts becomes nearest to a correction amount.

9. The apparatus according to claim 8, wherein said conversion unit converts the correction amount into the modified correction amount such that converted values in the block are not decentered within the block and within a repetition period of blocks.

10. The apparatus according to claim 8, wherein said correction amount determination unit determines a density correction amount of an image signal for each main scanning line as the correction amount.

11. The apparatus according to claim 1, further comprising a halftone processing unit which performs halftone processing for an image signal and outputs the m-bit image signal,
wherein said image correction unit adds the block-based modified correction amount to a pixel of an m-bit image signal which corresponds to the block after halftone processing.

12. An image forming apparatus comprising:
a correction amount determination unit which determines a correction amount for an image signal so as to correct banding as periodic density unevenness in a sub-scanning direction;
an image correction unit which corrects each pixel value of an n-bit image signal in accordance with the correction amount determined by said correction amount determination unit and outputs the image signal as a first corrected image signal; and
a quantization unit which quantizes, for each pixel, the first corrected image signal corrected by said image correction unit into a second corrected image signal of m bits smaller than n bits,
wherein said quantization unit diffuses, in a main scanning direction, quantization errors at the time of quantization of the first corrected image signal into the second corrected image signal so as to cancel the quantization errors within a predetermined region including a plurality of continuous pixels on a main scanning line, and
said correction amount determination unit determines, as the correction amount, a position correction amount for shifting an image signal on each main scanning line to an adjacent line in a sub scanning direction.

* * * * *